(12) United States Patent
Dai et al.

(10) Patent No.: US 11,081,748 B2
(45) Date of Patent: Aug. 3, 2021

(54) PACKAGING MATERIAL FOR POWER STORAGE DEVICE

(71) Applicant: TOPPAN PRINTING CO., LTD., Tokyo (JP)

(72) Inventors: Hiroshi Dai, Tokyo (JP); Junya Imamoto, Tokyo (JP); Yu Ogihara, Tokyo (JP); Masayoshi Suzuta, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 420 days.

(21) Appl. No.: 15/834,275

(22) Filed: Dec. 7, 2017

(65) Prior Publication Data

US 2018/0102514 A1    Apr. 12, 2018

Related U.S. Application Data

(63) Continuation of application No. PCT/JP2016/066887, filed on Jun. 7, 2016.

(30) Foreign Application Priority Data

Jun. 10, 2015  (JP) .............................. JP2015-117618
Sep. 2, 2015   (JP) .............................. JP2015-173072

(51) Int. Cl.
  *B32B 7/12*   (2006.01)
  *B32B 15/085* (2006.01)
  (Continued)

(52) U.S. Cl.
  CPC ............ *H01M 50/116* (2021.01); *B32B 7/12* (2013.01); *B32B 15/085* (2013.01); *B32B 15/20* (2013.01);
  (Continued)

(58) Field of Classification Search
  CPC ............ H01M 2/0282; H01M 2/0277; H01M 2/0287; H01M 2/08; H01G 11/16;
  (Continued)

(56) References Cited

U.S. PATENT DOCUMENTS 5,223,118 A    6/1993  Sonnenberg et al.
5,298,234 A *  3/1994  Nakazawa ............... C08K 9/02
                                              106/286.5

(Continued)

FOREIGN PATENT DOCUMENTS

CN    103907219 A    7/2014
JP    2000-173558    6/2000

(Continued)

OTHER PUBLICATIONS

Machine Translation of JP 2000-173558 A (Year: 2000).*

(Continued)

*Primary Examiner* — Callie E Shosho
*Assistant Examiner* — Steven A Rice
(74) *Attorney, Agent, or Firm* — Foley & Lardner LLP

(57) ABSTRACT

Packaging material for a power storage device, comprising at least a substrate layer, an adhesive layer, a metal foil layer and a sealant layer wherein the sealant layer contains an inorganic filler and an occupying ratio of the inorganic filler relative to the total thickness of the sealant layer is 5 to 50%, and also to a packaging material for a power storage device, comprising a substrate layer, a barrier layer and also to a packaging material for power storage device, which comprises a substrate layer, a barrier layer and a sealant layer arranged in this order wherein the barrier layer is made of a metal foil and has a corrosion inhibition treatment layer at least at a side of the sealant layer, and the sealant layer is (Continued)

formed directly on the corrosion inhibition layer, has a thickness of 5 to 30 μm, and contains a high melting point material.

6 Claims, 8 Drawing Sheets

(51) Int. Cl.
    *B32B 15/20*     (2006.01)
    *H01G 11/80*     (2013.01)
    *H01M 50/116*     (2021.01)
    *H01G 11/16*     (2013.01)
    *H01M 50/124*     (2021.01)
    *H01M 50/183*     (2021.01)

(52) U.S. Cl.
    CPC ............. *H01G 11/16* (2013.01); *H01G 11/80* (2013.01); *H01M 50/124* (2021.01); *H01M 50/183* (2021.01); *B32B 2264/107* (2013.01); *B32B 2307/714* (2013.01); *B32B 2307/7265* (2013.01); *B32B 2457/10* (2013.01); *Y02E 60/13* (2013.01)

(58) Field of Classification Search
    CPC ......... H01G 11/80; B32B 7/12; B32B 15/085; B32B 15/20; B32B 2264/107; B32B 2307/714; B32B 2307/7265; B32B 2457/10
    USPC .......................................................... 428/457
    See application file for complete search history.

(56) References Cited

U.S. PATENT DOCUMENTS

| | | | |
|---|---|---|---|
| 7,291,253 B2 | 11/2007 | Pavlov et al. | |
| 7,820,535 B2 | 10/2010 | Okubo et al. | |
| 7,879,222 B2 | 2/2011 | Shalyt et al. | |
| 8,440,555 B2 | 5/2013 | Okubo et al. | |
| 2013/0130150 A1* | 5/2013 | Heo | H01M 8/102 429/482 |
| 2014/0072864 A1* | 3/2014 | Suzuta | B32B 27/365 429/176 |
| 2014/0255765 A1* | 9/2014 | Akita | B32B 15/20 429/176 |
| 2015/0104698 A1* | 4/2015 | Fung | H01M 50/124 429/175 |

FOREIGN PATENT DOCUMENTS

| | | |
|---|---|---|
| JP | 2001-043835 A | 2/2001 |
| JP | 2002-319378 | 10/2002 |
| JP | 2004-234995 A | 8/2004 |
| JP | 2005-116322 A | 4/2005 |
| JP | 2005-290413 A | 10/2005 |
| JP | 2006-318685 A | 11/2006 |
| JP | 2009-073010 A | 4/2009 |
| JP | 2009-299193 A | 12/2009 |
| JP | 2013-093182 | 5/2013 |
| JP | 2013-157287 | 8/2013 |
| JP | 2013-177531 A | 9/2013 |
| JP | 2014-127258 | 7/2014 |
| JP | 2015-010991 A | 1/2015 |
| JP | 2015-172511 A | 10/2015 |
| JP | 2016-114391 A | 6/2016 |

OTHER PUBLICATIONS

AZo Materials, "Polystyrene (PS)(C8H8) Plastic Recycling", Dec. 4, 2012, p. 1 (Year: 2012).*
Fisher Scientific, "Aluminum Hydroxide Safety Data Sheet", Jan. 22, 2015, p. 3 (Year: 2015).*
Ampacet, "Antiblock Additives", May 13, 2014 (Year: 2014).*
Machine translation of JP 2014-127258 A (Year: 2014).*
Machine translation of JP 2004-234995 A (Year: 2004).*
International Search Report Issued in International Patent Application No. PCT/JP2016/066887 dated Sep. 13, 2016.
International Search Report issued in International Patent Application No. PCT/JP2016/068970 dated Sep. 20, 2016.
Toshikazu Okubo, et al., "Electrochemical Monitoring Method for Filing Capability of Copper Electroplating Solution for Via Filling", Journal of Japan Institute of Electronics Packaging (2005), vol. 8, No. 4, pp. 318-324 (7 pages).
Japanese Office Action dated Dec. 3, 2019 for corresponding Application No. 2015-173072.
Chinese Office Action dated Nov. 26, 2019 for corresponding Application No. 201610399626.3.
Office Action dated Jun. 2, 2020 for corresponding Chinese Patent Application No. 201610399626.3.
Office Action dated Jan. 15, 2021 for corresponding Japanese Patent No. 6728600.
Packaging Technique Handbook, Jul. 1, 1995, 1st Impression of 1st Edition published, Publication Office: Japan Packaging Institute; pp. 578-582.

* cited by examiner

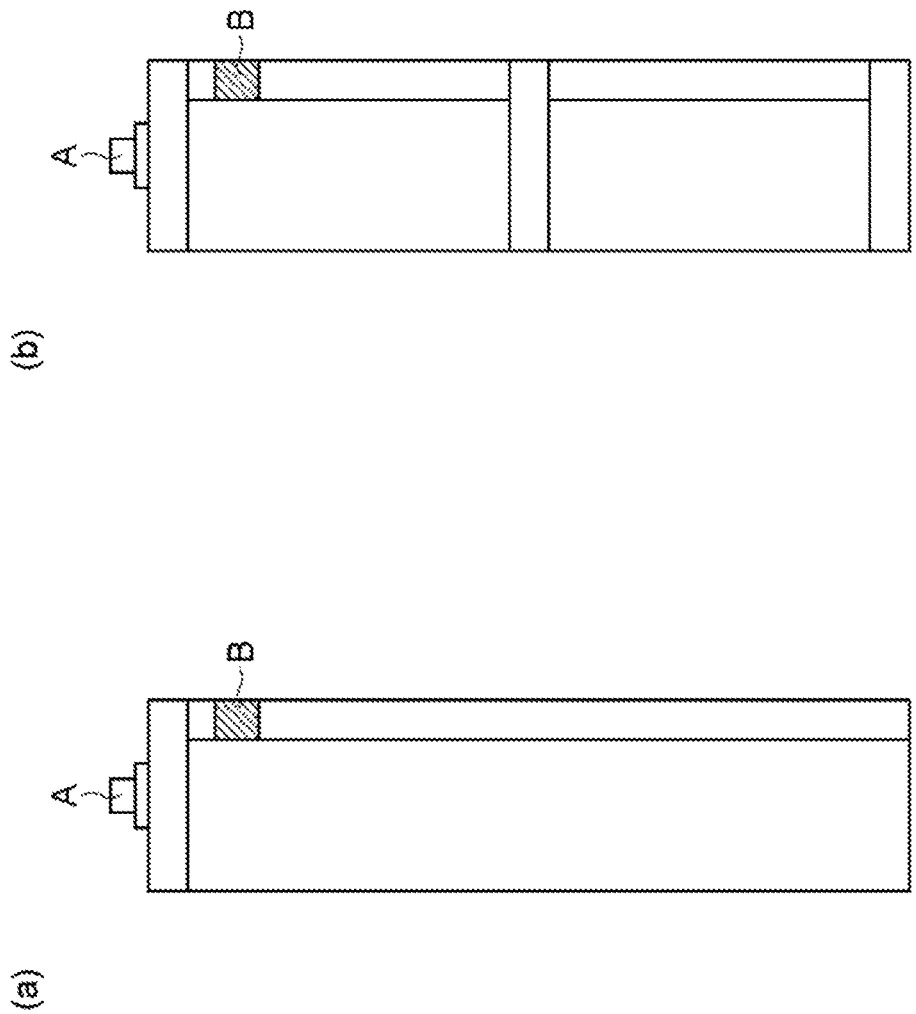

PACKAGING MATERIAL FOR POWER STORAGE DEVICE

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2016/066887, filed Jun. 7, 2016, which is based upon and claims the benefit of Japanese Patent Application No. 2015-117618, filed Jun. 10, 2015 and Japanese Patent Application No. 2015-173072, filed Sep. 2, 2015, the entireties of which are hereby incorporated by reference.

TECHNICAL FIELD

The present invention relates to packaging material for a power storage device.

BACKGROUND ART

Known power storage devices include, for example, secondary batteries such as lithium-ion batteries, nickel-hydrogen batteries and lead storage batteries, and electrochemical capacitors such as electric double-layer capacitors. Due to the miniaturization and/or limitation on setup space of mobile devices, there are now required further downsizing of power storage devices, and attention has been paid to lithium-ion batteries whose energy density is high. As to the packaging materials used for lithium-ion batteries, although metal cans have been hitherto used, there are increasing use of multilayer films (e.g. configured to have substrate layer/metal foil layer/sealant layer) that are light in weight and high in heat dissipation and can be made at low costs (for example, see PTL 1).

CITATION LIST

Patent Literature

PTL 1: JP 2013-157287 A

SUMMARY OF THE INVENTION

Technical Problem

As one of measures for realizing the thinning of a packaging material for power storage battery, consideration is made of thinning of a sealant layer. However, where the sealant layer is made thin according to the prior art technique such as of PTL 1 or the like, a tab lead and a metal layer come closer to each other, with concern that short-circuiting may occur. It is assumed that when the thinning is in progress, the variation of a layer thickness ascribed to the flow of a resin at the sealant layer side in the course of heat sealings (e.g., top sealing, side sealing and degassing heat sealing) is liable to occur, resulting in the likelihood of causing short-circuiting to occur. It will be noted that the top sealing means the heat sealing of portions sandwiching the tab lead, the side sealing means the heat sealing of the other portions, and the degassing heat sealing means heat sealing of a packaging material, for example, at the central portions thereof after having injected an electrolytic solution into the packaging material shaped into a pouch by heat sealing the above portions.

Under such circumstances as stated above, the present invention has for an object the provision of a packaging material for power storage device, which is better able to maintain good insulating properties even in the case where its sealant layer is made thin.

Solution to Problem (First Invention)

In order to achieve the above object, the invention contemplates to provide a packaging material for power storage device, which comprises at least a substrate layer, an adhesive layer, a metal foil layer, and a sealant layer wherein the sealant layer contains an inorganic filler and an occupying ratio of the inorganic filler relative to the total thickness of the sealant layer in the section along a lamination direction is at 5 to 50%. In doing so, even when the sealant layer is made thin, good insulating properties can be maintained.

In the practice of the invention, the content of the inorganic filler is preferably from 5 to 35 mass % based on the total mass of the sealant layer. By this, the inorganic filler is more likely to adequately play a role as a spacer and suppress the lowering of adhesion.

It is preferred that the sealant layer is constituted of two or more layers, at least one layer of which is free of the inorganic filler. As to the layer to which no inorganic filler is added, it can be suppressed to lower the inherent characteristics of the sealant layer due to the incorporation of an inorganic filler.

Preferably, the thickness of the layer containing an inorganic filler is not less than 50% relative to the total thickness of the sealant layer. If outside the above range, there is a tendency that the flow of a resin is liable to occur and short-circuiting is apt to occur in the case where heat or pressure is exerted to the layer during heat sealing.

The sealant layer is preferably such that an inorganic filler-containing layer is sandwiched between inorganic filler-free layers. In doing so, insulating characteristics can be developed without impeding adhesion with a metal foil layer 13 and heat sealing characteristics.

The inorganic filler-containing layer is preferably one that is made of an acid-modified polyolefin. This can permit adhesion with the inorganic filler to be enhanced and resin fluidity can be more lowered in the case where heat or pressure is exerted during heat sealing.

The inorganic filler is preferably one that has been subjected to surface treatment. This permits the adhesion between a resin forming the sealant layer and an inorganic filler to be enhanced and resin fluidity on melting to be more lowered.

(Second Invention)

The present invention contemplates to provide a packaging material for power storage device (a packaging material for secondary battery), which comprises at least a substrate layer, a barrier layer and a sealant layer in this order wherein the barrier layer is made of a metal foil and has a corrosion inhibition treatment layer at least on a sealant layer side, and the sealant layer is formed directly on the corrosion inhibition treatment layer, has a thickness of 5 to 30 μm and contains a high melting point material.

In recent years, portable devices such as cell phones, smartphones and portable music reproduction devices, hybrid electric cars, and electric cars have now been in widespread use. As a battery used as their electric source or power source for supplying electricity, there are used secondary batteries (power storage devices), typical of which are a nickel-hydrogen battery and a lithium ion battery. The secondary battery is required to be light in weight and compact in size for use in portable devices. In in-vehicle applications, multilayerization by parallel and series connections is being in progress for realizing high energization and high output power, and lightweight and compactness are required.

By the way, the secondary battery makes use of both a metal can and a laminate film packaging material depending on the purpose in use and the use environment. From the standpoint of light-weighting and the degree of freedom in shape, attention has now been paid to a laminate film packaging material.

In order to prevent the infiltration of moisture from outside of the secondary battery, the usual practice is generally to use a metal foil, typical of which is an aluminum foil or a stainless foil, as a barrier layer of a laminate film packaging material. An aluminum foil laminate film has been frequently used, which makes use of an aluminum foil selected among these metal foils and used as a barrier layer in view of the lightweight and ductility and also of material costs thereof.

The aluminum foil laminate film is a laminate of an aluminum foil and resins, and generally includes a sealant layer, an adhesive layer, a corrosion inhibition treatment layer, an aluminum foil layer, a corrosion inhibition treatment layer, a substrate adhesive layer, and a substrate layer (nylon, PET or the like) configured in this order from the inner layer closest to a battery element.

For example, the battery element of a lithium ion battery includes, aside from a positive electrode material, a negative electrode material, and a separator for preventing mutual contact between the electrodes, either an electrolytic solution dissolving an electrolyte (lithium salt) in an aprotic solvent such as propylene carbonate, ethylene carbonate, dimethyl carbonate, diethyl carbonate, ethyl methyl carbonate or the like, or an electrolyte layer made of a polymer gel impregnated with such an electrolytic solution as mentioned above. The electric power stored in the battery element is supplied to outside of the battery through metal terminals (hereinafter referred to as tab leads).

In order to provide a secondary battery that is light in weight and compact and has a higher capacitance, thinning of such a laminate film packaging material is important. Nevertheless, if the sealant layer that is an innermost layer is made too small in thickness, the metal foil used as a barrier layer and the tab leads come into contact with each other, with some concern that the resulting secondary battery is short-circuited.

For preventing the short-circuiting at the end portions of the secondary battery, there has been hitherto proposed a method wherein an intermediate layer is provided between a barrier layer and a sealant layer to keep a film thickness of a heat sealing portion thereby preventing the contact between tab leads and a metal foil used as the barrier layer (i.e. the occurrence of short-circuiting) as described, for example, in JP 2011-138793 A.

However, although the short-circuiting between the tab leads and the metal foil used as a battery layer of a packaging material can be prevented by the method set out in JP 2011-138793 A, the addition of one intermediate layer leads to a large thickness.

With lithium ion secondary batteries that have been recently in widespread use, it is essential to prevent the short-circuiting of the secondary battery for the reason that the battery performance is lowered because of the electrical insulating properties being not maintained and there is a danger of causing heat generation or ignition. On the other hand, however, an effective means for preventing the short-circuiting between the tab leads and a packaging material for secondary battery while thinning the packaging material has not been satisfactorily obtained at present.

In contrast, according to the present invention, the sealant layer is provided directly, or not via an adhesive, on the corrosion inhibition treatment layer which is a first surface of the barrier layer as set forth before. The thickness of the sealant layer can be at 5 to 30 μm and a high melting point material is contained in the sealant layer, so that although small in thickness, a packaging material for power storage device having improved or even excellent electric insulation can be provided.

In the packaging material for power storage device of the invention is preferably such that the sealant layer is formed of an acid-modified polyolefin resin.

When the sealant layer is formed using an acid-modified polyolefin resin, strong adhesion between the sealant layer and the barrier layer can be better achieved. Moreover, when the packaging material for power storage device is shaped into a pouch wherein the sealant layer is facing inside and is heat sealed, the sealant layers can be more strongly bonded to each other.

In the packaging material for power storage device of the present invention, it is preferred that the sealant layer is formed of a resin whose melting point is from 100 to 165° C.

When the melting point of the sealant resin is at 100 to 165° C., more stable heat sealing characteristics can be obtained.

In the packaging material for power storage device of the invention, the average particle size of the high melting point material is preferably 30 to 80% of the thickness of the sealant layer.

When the high melting point material having a particle size of 30 to 80% of the thickness of the sealant layer is contained in the sealant layer, it becomes more easy to maintain the thickness of the sealant layer at its heat sealing portion. Thus, improved or even excellent electric insulation is more easily obtained without causing short-circuiting to occur.

In the packaging material for power storage device of the invention, it is preferred that the high melting point material has a melting point of not lower than 220° C.

When the melting point of the high melting point material is 220° C. or over, the high melting point material is less likely to be melted upon heat sealing, so that the thickness of the sealant layer is maintained, making it easy to obtain improved or even excellent electric insulation without causing short-circuiting to occur.

In the packaging material for power storage device of the present invention, it is preferred that the number of the high melting point material per unit volume of the sealant layer is 100 to 15,000,000 particles/cm$^3$.

Since the number of the high melting point material per unit volume of the sealant layer is from 100 to 15,000,000 particles/cm$^3$, the high melting point material can be uniformly dispersed, making it easy to stably obtain improved or even excellent electric insulation.

Effect of Invention

According to a first invention, there can be provided a packaging material for power storage device capable of maintaining improved or good electric insulation even in the case that a sealant layer is made thin. Additionally, according to the first invention, there can be provided a packaging material wherein even when the sealant layer is configured to have a thickness of not larger than 35 μm, not only short-circuiting during top sealing, side sealing or degassing heat sealing can be suppressed, but also the lamination strength and seal strength required for the sealant layer are not lowered.

According to a second invention, there can be provided a packaging material for power storage device capable of better satisfying both adequate thinness and improved or even excellent electric insulation. More particularly, according to the packaging material for power storage device of the second invention, when the sealant layer is made thin, short-circuiting of tab leads can be better suppressed and improved or even excellent electric insulation can be maintained.

BRIEF DESCRIPTION OF THE DRAWINGS

FIG. 8 is a schematic view illustrating a method of making an evaluation sample in the Examples.

DESCRIPTION OF EMBODIMENTS

Figure 1:
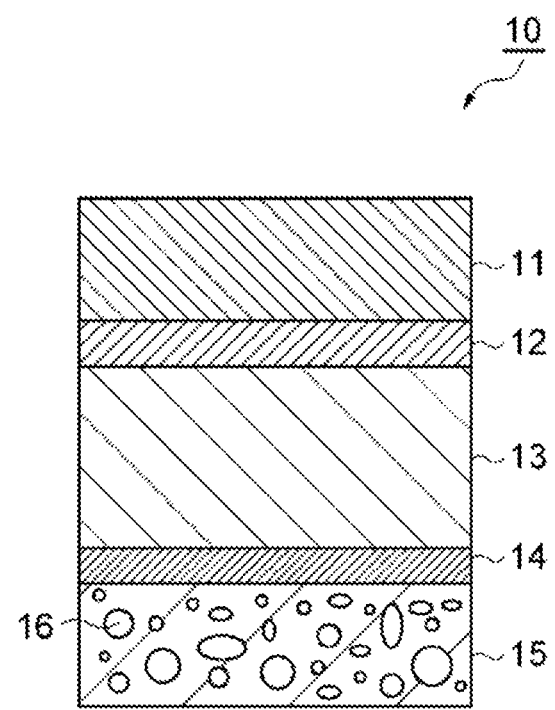
FIG. 1 is a schematic sectional view of a packaging material for power storage device according to an embodiment of the invention.

Preferred first and second embodiments of the first and second inventions are, respectively, described in detail with reference to the accompanying drawings. It will be noted that like reference numerals indicate like or corresponding portions in the drawings and their redundant illustrations are omitted. The dimensional ratios in the drawings should not be construed as limited to only those ratios shown in the drawings. It is to be understood that the preferred embodiments described below are intended to be representative of the present invention and that the present invention is not necessarily intended to be limited to the preferred embodiments.

First Embodiment

[Packaging Material for Power Storage Device]

FIG. 1 is a sectional view schematically showing an embodiment of a packaging material for power storage device of the present invention. As shown in FIG. 1, a packaging material (packaging material for power storage device) 10 of this embodiment is a laminate wherein there are successively stacked a substrate layer 11, a first adhesive layer 12 formed on one surface of the substrate layer 11, a metal foil layer 13 formed on a surface of the first adhesive layer 12 opposite to the substrate layer 11, a corrosion inhibition treatment layer 14 formed on a surface of the metal foil layer 13 opposite to the first adhesive layer 12, and a sealant layer 15 formed on a surface of the corrosion inhibition treatment layer 14 opposite to the metal foil layer 13. The packaging material 10 is formed such that the substrate layer 11 is an outermost layer and the sealant layer 15 is an innermost layer. That is, the packaging material 10 is used in such a way that the substrate layer 11 is facing toward an outer side of the power storage device and the sealant layer 15 is facing toward the inner side of the power storage device. The respective layers are illustrated below.

<Substrate Layer 11>

The substrate layer 11 is provided for the purposes of imparting a heat resistance in a sealing step during the production of a power storage device and coping with pinhole defects that might occur during processing or distribution, and it is preferred to use a resin layer having insulating properties. Such a resin layer includes, for example, a stretched or unstretched film, such as a polyester film, a polyamide film, a polypropylene film or the like, in the form of a single layer film or a multilayer film wherein two or more layers are stacked. More particularly, there can be used a co-extruded multilayer stretched film obtained by co-extruding a polyethylene terephthalate film (PET) and a nylon film (Ny) using an adhesive resin, followed by stretching treatment.

The thickness of the substrate layer 11 is preferably from 6 to 40 μm, more preferably from 10 to 25 μm. If the thickness of the substrate layer 11 is not less than 6 μm, there is a tendency that the pinhole resistance and insulation of the packaging material 10 for power storage device can be improved.

<First Adhesive Layer 12>

The first adhesive layer 12 is a layer bonding between the substrate layer 11 and the metal foil layer 13. The constituent materials of the first adhesive layer 12 include, for example, a polyurethane resin obtained by reacting a bi- or higher functional isocyanate compound with a main agent such as a polyester polyol, a polyether polyol, an acrylic polyol, a carbonate polyol or the like.

The polyester polyols are obtained by using one or more of aliphatic dibasic acids such as succinic acid, glutaric acid, adipic acid, pimelic acid, suberic acid, azelaic acid, sebacic acid, brasylic acid and the like; and aromatic dibasic acids such as isophthalic acid, terephthalic acid, naphthalene dicarboxylic acid and the like; and one or more of aliphatic diols such as ethylene glycol, propylene glycol, butanediol, neopentyl glycol, methyl pentanediol, hexanediol, heptanediol, octanediol, nonanediol, decanediol, dodecanediol and the like; alicyclic diols such as cyclohexanediol, hydrogenated xylylene glycol and the like; and aromatic diols such as xylylene glycol.

The polyester polyols include those polyester urethane polyols obtained by subjecting the hydroxyl group at both ends of the polyester polyols obtained by use of the above-indicated dibasic acids and diols to chain elongation, for example, with isocyanate compounds selected from 2,4- or 2,6-tolylene diisocyanate, xylylene diisocyanate, 4,4'-diphenylmethane diisocyanate, methylene diisocyanate, isopropylene diisocyanate, lysine diisocyanate, 2,2,4- or 2,4,4-trimethylhexamethylene diisocyanate, 1,6-hexamethylene diisocyanate, methylcyclohexane diisocyanate, isophorone diisocyanate, 4,4'-dicyclohexylmethane diisocyanate, isopropylidenedicyclohexyl-4,4'-diisocyanate and the like, or adducts, biurets and isocyanurates of isocyanate compounds selected from one or more compounds indicated above.

The polyether polyols include ether-based polyols such as polyethylene glycol, polypropylene glycol and the like, and polyurethane polyols obtained by further reaction with the isocyanate compounds used above as a chain elongation agent.

Usable acrylic polyols are acrylic resins obtained by polymerizing such acrylic monomers as indicated above.

The carbonate polyols are ones obtained by reaction between carbonate compounds and diols. The carbonate compounds used include dimethyl carbonate, diphenyl carbonate, ethylene carbonate and the like. On the other hand, the diols include aliphatic diols such as ethylene glycol, propylene glycol, butanediol, neopentyl glycol, methylpentane diol, hexane diol, heptane diol, octane diol, nonane diol, decane diol, dodecane diol and the like; alicyclic diols such as cyclohexane diol, hydrogenated xylylene glycol and the like; and aromatic diols such as xylylene glycol. That is, there can be mentioned carbonate polyols using one or more mixtures of the above diols, or polycarbonate urethane polyols having subjected to chain elongation with such isocyanate compounds indicated above.

A variety of the polyols indicated above may be used singly or a combination of two or more depending on the function and performance required for the packaging material. If such an isocyanate compound as indicated above is used as a hardening agent for these main agents, the resulting material can be used as a polyurethane adhesive.

For the purpose of facilitating adhesion, the polyurethane resin may be formulated with a carbodiimide compound, an oxazoline compound, an epoxy compound, a phosphorus compound, a silane coupling agent and the like.

Examples of the carbodiimide compound include N,N'-di-o-tolylcarbodiimide, N,N'-diphenylcarbodiimide, N,N'-di-2-,6-dimethylphenylcarbodiimide, N,N'-bis(2,6-diisopropylphenyl)carbodiimide, N,N'-dioctyldecylcarbodiimide, N-tolyl-N'-cyclohexylcarbodiimide, N,N'-di-2,2-di-t-butylphenylcarbodiimide, N-tolyl-N'-phenylcarbodiimide, N,N'-di-p-nitrophenylcarbodiimide, N,N'-di-p-aminophenylcarbodiimide, N,N'-di-p-hydroxyphenylcarbodiimide, N,N'-di-cyclohexylcarbodiimide, N,N'-di-p-tolylcarbodiimide and the like.

Examples of the oxazoline compound include monooxazoline compounds such as 2-oxazoline, 2-methyl-2-oxazoline, 2-phenyl-2-oxazoline, 2,5-dimethyl-2-oxazoline, 2,4-diphenyl-2-oxazoline and the like, and dioxazoline compounds such as 2,2'-(1,3-phenylene)-bis(2-oxazoline), 2,2'-(1,2-ethylene)-bis(2-oxazoline), 2,2'-(1,4-butylene)-bis(2-oxazoline), 2,2'-(1,4-phenylene)-bis(2-oxazoline) and the like.

Examples of the epoxy resin include diglycidyl ethers of aliphatic diols such as 1,6-hexane diol, neopentyl glycol and polyalkylene glycol, polyglycidyl ethers of aliphatic polyols such as sorbitol, sorbitan, polyglycerol, pentaerythritol, diglycerol, glycerol, trimethylolpropane and the like, polyglycidyl esters of alicyclic polyols such as cyclohexane dimethanol and the like, diglycidyl esters or polyglycidyl esters of aliphatic and aromatic polyvalent carboxylic acids such as terephthalic acid, isophthalic acid, naphthalene dicarboxylic acid, trimellitic acid, adipic acid, sebacic acid and the like, diglycidyl esters or polyglycidyl esters of polyvalent phenols such as resorcinol, bis-(p-hydroxyphenyl)methane, 2,2-bis-(p-hydroxyphenyl)propane, tris-(p-hydroxyphenyl)methane, 1,1,2,2-tetrakis(p-hydroxyphenyl) methane and the like, N-glycidyl derivatives of amines such as N,N'-diglycidylaniline, N,N,N-diglycidyltoluidine, N,N,N',N'-tetraglycidyl-bis-(p-aminophenyl)methane and the like, triglycidyl derivatives of aminophenols, triglycidyltris(2-hydroxyethyl)isocyanurate, triglycidyl isocyanurates, ortho-cresol type epoxy compounds, and phenol novolac type epoxy resins.

Examples of the phosphorus compounds include tris(2,4-di-t-butylphenyl)phosphite,tetrakis(2,4-di-t-butylphenyl)-4, 4'-biphenylene phosphite, bis(2,4-di-t-butylphenyl)pentaerythritol-di-phosphite, bis(2,6-di-t-butyl-4-methylphenyl)pentaerythritol-di-phosphite, 2,2-methylene bis(4,6-di-t-butylphenyl) octylphosphite, 4,4'-butylidene-bis (3-methyl-6-t-butylphenyl-di-tridecyl)phosphite, 1,1,3-tris (2-methyl-4-ditridecylphosphite-5-t-butyl-phenyl)butane, (2-methyl-4-ditridecylphosphite-5-t-butyl-phenyl)butane, tris(mixed mono- and di-nonylphenyl)phosphite, tris(nonylphenyl)phosphite, 4,4'-isopropylidene bis(phenyl-dialkyl phosphite) and the like.

Examples of the silane coupling agent include a variety of silane coupling agents such as vinyl triethoxysilane, vinyl tris(β-methoxyethoxy)silane, γ-methacryloxypropyltrimethoxysilane, vinyl acetoxysilane, γ-glycidoxypropyltrimethoxysilane, γ-glycidoxypropyltriethoxysilane, β-(3,4-epoxycyclohexyl)ethyltrimethoxysilane, γ-chloropropylmethoxysilane, vinyl trichlorosilane, γ-mercaptopropyltrimethoxysilane, γ-aminopropyltriethoxysilane, N-β-(aminoethyl)-γ-aminopropyltrimethoxysilane and the like.

Although depending on the properties required for an adhesive, various types of other additives and stabilizers may be added to the polyurethane resin mentioned above.

Although not specifically limited, the thickness of the first adhesive layer 12 is preferably, for example, 1 to 10 μm, more preferably 3 to 7 μm, from the standpoint of obtaining desired adhesion strength, followability and processability.

(Metal Foil Layer 13)

The metal foil layer 13 has water vapor barrier properties, ensuring that moisture is prevented from being infiltrated into the power storage device. The metal foil layer 13 has ductility enough for allowing deep drawing. The metal foil layer 13 used include a variety of metal foils such as aluminum, stainless steel and the like, of which an aluminum foil is preferred in view of weight (specific weight), moisture proofness, processability and cost.

An ordinary soft aluminum foil can be used as the aluminum foil. For the purpose of imparting a pinhole resistance and molding ductility, an iron-containing aluminum foil is preferably used. The content of iron in the aluminum foil is preferably 0.1 mass % to 9.0 mass %, more preferably 0.5 to 2.0 mass %, in 100 mass % of the aluminum foil. If the content of iron is 1 mass % or over, there can be obtained a packaging material 10 having more improved or even excellent pinhole resistance and ductility. When the content of iron is not larger than 9.0 mass %, there can be obtained a packaging material 10 having more improved or even excellent flexibility.

More preferably, the aluminum foil is a soft aluminum foil which has been subjected to annealing treatment (e.g. an aluminum foil made of a 8021 material or a 8079 material defined in JIS Standards) from the viewpoint that a desired degree of molding ductility can be imparted.

Although not specifically limited, the thickness of the metal foil layer 13 is preferably 9 to 200 μm, more preferably 15 to 100 μm, when taking barrier properties, a pinhole resistance and processability into account.

Where an aluminum foil is used as the metal foil layer 13, an untreated aluminum foil may be used as the aluminum foil. In view of imparting a resistance to electrolytic solution, an aluminum foil having been subjected to defatting treatment is preferred. The defatting treatment can be broadly classified into a wet type and a dry type.

The wet type includes acid defatting and alkali defatting. The acids used for the acid defatting include, for example, inorganic acids such as sulfuric acid, nitric acid, hydrochloric acid, hydrofluoric acid and the like. These inorganic acids may be use singly or in combination of two or more. From the standpoint that the etching effect of the aluminum foil is improved, various types of metals salts serving as a supply source of Fe ions and Ce ions may be further formulated, if necessary. The alkalis used for the alkali defatting includes a strong etching type of alkali such as sodium hydroxide. Those formulated with a weakly alkaline compound or a surfactant may also be used. These defatting treatments may be carried out by an immersion method or a spraying method.

The dry type is a method wherein aluminum is subjected to defatting treatment in an annealing step of aluminum. Aside from the defatting treatment, a flame treatment or a corona treatment may be carried out. Moreover, there may be mentioned such a defatting treatment that contaminant substances are oxidatively decomposed and removed by activated oxygen generated by irradiation of UV light with a specified wavelength.

It will be noted that where an aluminum foil is defatted, the foil may be subjected to defatting treatment only on one surface or on both surfaces thereof.

<Corrosion Inhibition Treatment Layer 14>

The corrosion inhibition treatment layer 14 is a layer provided to prevent the corrosion of the metal foil layer 13 with an electrolytic solution or hydrofluoric acid generated by reaction between the electrolytic solution and moisture. The corrosion inhibition treatment layer 14 is formed, for example, by defatting treatment, hot water conversion treatment, anodization treatment, chemical conversion treatment, or a combination of these treatments. The corrosion inhibition treatment layer may be formed on a first adhesive layer 12 side surface of the metal foil layer 13, or may be formed on both surfaces of the metal foil layer 13. Where the corrosion inhibition treatment layer is formed on both surfaces of the metal foil layer 13, the configurations of both corrosion inhibition treatment layers may be the same or different.

The defatting treatment includes acid defatting or alkali defatting. As the acid defatting, mention is made of a method wherein inorganic acids such as sulfuric acid, nitric acid, hydrochloric acid, hydrofluoric acid and the like are used singly or a mixed solution thereof. When there is used an acid defatting agent obtained by dissolving a fluorine-containing compound, such as monosodium ammonium difluoroide, in such an inorganic acid as indicated above and an aluminum foil is used particularly as the metal foil layer 13, not only a defatting effect of aluminum is obtained, but also passive aluminum fluoride can be formed, thus being effective in improving a hydrofluoric acid resistance. As the alkali defatting, mention is made of a method using sodium hydroxide.

The hot water conversion treatment includes, for example, a boehmite treatment wherein an aluminum foil is immersed in boiling water, to which triethanolamine is added.

The anodization treatment includes, for example, an alumite treatment.

The chemical conversion treatment includes those of an immersion type and a coating type. The immersion-type chemical conversion treatment includes, for example, a variety of chemical conversion treatments such as chromate treatment, zirconium treatment, titanium treatment, vanadium treatment, molybdenum treatment, calcium phosphate treatment, strontium hydroxide treatment, cerium treatment, ruthenium treatment and a treatment of a mixed phase thereof. On the other hand, the coating-type chemical conversion treatment includes a method of coating a coating agent having corrosion inhibition ability on the metal foil layer 13.

Where at least a part of the corrosion inhibition treatment layer is formed by any one of the hot water conversion treatment, the anodization treatment and the chemical conversion treatment selected among those corrosion inhibition treatments indicated above, it is preferred to preliminarily carry out such a defatting treatment as set out above. It will be noted that when a metal foil having subjected to defatting treatment is used as the metal foil layer 13, it is unnecessary to carry out the defatting treatment again in the course of the formation of the corrosion inhibition treatment layer.

The coating agent used for the coating-type chemical conversion treatment preferably contains trivalent chromium. Moreover, the coating agent may further contain at least one polymer selected from the group consisting of cationic polymers and anionic polymers.

With respect particularly to the hot water conversion treatment and the anodization treatment selected among the above treatments, an aluminum foil surface is dissolved with a treating agent to form aluminum compounds (boehmite, alumite) to achieve an improved or even excellent characteristic in corrosion resistance. Accordingly, there is provided such a configuration that a co-continuous structure is formed including from the metal foil layer 13 using an aluminum foil to the corrosion inhibition treatment layer 14, so that it may be possible to form the corrosion inhibition treatment layer 14 only by a pure coating technique that is embraced within the definition of the chemical conversion treatment but not included within the definition of the chemical conversion treatment as will be described hereinafter. This method includes, for example, one wherein a sol of a rare earth element oxide, such as cerium oxide, which has an average particle size of not larger than 100 μm, is used as a material having a corrosion inhibition effect (inhibitor effect) on aluminum and suited in view of environmental aspects. When using this method, an ordinary coating method is able to impart a corrosion inhibition effect to a metal foil such as an aluminum foil.

The sol of a rare earth element oxide includes those sols making use, for example, of various solvents such as water, alcohols, hydrocarbons, ketones, esters, ethers and the like. Of these, aqueous sols are preferred.

The sol of a rare earth element oxide has to be stabilized with respect to its dispersion state, for which the usual practice is to use dispersion stabilizing agents including inorganic acids, or salts thereof, such as nitric acid, hydrochloric acid, phosphoric acids and the like, and organic acids such as acetic acid, malic acid, ascorbic acid, lactic acid and the like. Of these dispersion stabilizing agents, phosphoric acid would be particularly expected in the packaging material 10 in respect of (1) dispersion stabilization of the sol, (2) an improvement in adhesion to the metal foil layer 13 resulting from the aluminum chelating ability of phosphoric acid, (3) the impartment of a resistance to electrolytic solution due to the capture (passive-state formation) of aluminum ions dissolved out by the influence of hydrofluoric acid, and (4) an improvement in the coagulation force of the corrosion inhibition treatment layer 14 (oxide layer) due to the likelihood of causing the dehydration condensation of phosphoric acid even at low temperature.

The phosphoric acids or their salts include orthophosphoric acid, pyrophosphoric acid, metaphosphoric acid, or alkali metal salts and ammonium salts. Of these, condensed phosphoric acids, such as trimetaphosphoric acid, tetrametaphosphoric acid, hexametaphosphoric acid, ultrametaphosphoric acid and the like, and alkali metal salts and ammonium salts thereof are preferred in order to develop the function in the packaging material 10. When taking into account the dry film formability (drying capacity, heat quantity) at the time when the corrosion inhibition treatment layer made of a rare earth oxide is formed according to various coating methods using the sol of the rare earth oxide, a sodium salt is more preferred due to its better dehydration condensability at low temperature. A preferred phosphoric acid salt is a water-soluble one.

The formulation ratio of the phosphoric acid (or its salt) to the rare earth element oxide is preferably at 1 to 100 parts by mass relative to 100 parts by mass of the rare earth element oxide. When the formulation ratio is not less than 1 part by mass per 100 parts by mass of the rare earth element oxide, the sol of the rare earth element oxide becomes more stable, resulting in better function of the packaging material 10. The formation ratio is more preferably not less than 5 parts by mass per 100 parts by mass of the rare earth element oxide. When the formulation ratio is not larger than 100 parts by mass per 100 parts by mass of the rare earth element oxide, the function of the sol of the rare earth element oxide is enhanced along with the better performance of preventing the erosion of an electrolytic solution. The formulation ratio is preferably not larger than 50 parts by mass, more preferably not larger than 20 parts by mass, per 100 parts by mass of the rare earth element oxide.

The corrosion inhibition treatment layer 14 formed by the sol of a rare earth element oxide is an aggregate of inorganic particles, with some concern that the coagulation force of the layer per se lowers even after a dry curing step. Accordingly, in order to compensate for the coagulation force, the corrosion inhibition treatment layer 14 in this case is preferably compositized with the following anionic polymers or cationic polymers.

The anionic polymers include those polymers having a carboxy group such, for example, as poly(meth)acrylic acid (or its salt) and copolymers made of poly(meth)acrylic acid as a main component and obtained by copolymerization. The copolymerizing components of the copolymers include alkyl (meth)acrylate monomers (wherein the alkyl group is a methyl group, an ethyl group, an n-propyl group, an i-propyl group, an n-butyl group, an i-butyl group, a t-butyl group, a 2-ethylhexyl group, a cyclohexyl group and the like; amide group-containing monomers such as (meth)acrylamide, N-alkyl (meth)acrylamides and N,N-dialkyl (meth)acrylamides (wherein the alkyl group is a methyl group, an ethyl group, an n-propyl group, an i-propyl group, an n-butyl group, an i-butyl group, a t-butyl group, a 2-ethylhexyl group, a cyclohexyl group or the like), N-alkoxy (meth)acrylamides and N,N-dialkoxy (meth)acrylamides (wherein the alkoxy group is a methoxy group, an ethoxy group, a butoxy group, an isobutoxy group or the like), amide group-containing monomer such as N-methylol (meth)acrylamide, N-phenyl (meth)acrylamide and the like; hydroxyl group-containing monomers such as 2-hydroxyethyl (meth)acrylate, 2-hydroxypropyl (meth)acrylate and the like; glycidyl group-containing monomers such as glycidyl (meth)acrylate, allyl glycidyl ether and the like; silane-containing monomers such as (meth)acryloxypropyltrimethoxysilane and the like; and isocyanate group-containing monomers such as (meth)acryloxypropyl isocyanate and the like.

These anionic polymers serve to improve the stability of the corrosion inhibition treatment layer 14 (oxide layer) obtained by use of the sol of a rare earth element oxide. This is achieved by the effect of protecting the hard, brittle oxide layer with an acrylic resin component and also by the effect of capturing phosphoric acid salt-derived ion contaminants (particularly, a sodium ion) (cation catcher) contained in the sol of a rare earth element oxide. In other words, if alkali metal ions particularly such as sodium ions or alkaline metal ions are contained in the corrosion inhibition treatment layer 14 obtained by use of the sol of a rare-earth element oxide, the corrosion inhibition treatment layer 14 is apt to be degraded from the sites containing the ions which serve as an origin. To avoid this, the durability of the corrosion inhibition treatment layer 14 is improved by fixing the sodium ions and the like contained in the rare earth oxide sold with an anionic polymer.

The corrosion inhibition treatment layer 14 formed of a combination of an anionic polymer and the sol of a rare earth element oxide has a similar corrosion inhibition performance as a corrosion inhibition treatment layer 14 formed by subjecting an aluminum foil to chromate treatment. The anionic polymer should preferably have a structure wherein a substantially water-soluble polyanionic polymer is cross-linked. The crosslinking agent used to form the structure, mention is made, for example, of those compounds having an isocyanate group, a glycidyl group, a carboxy group or an oxazoline group.

Examples of the isocyanate group-containing compound include diisocyanates such as tolylene diisocyanate, xylylene diisocyanate or hydrogenated adducts thereof, hexamethylene diisocyanate, 4,4'-diphenylmethane diisocyanate or hydrogenated adducts thereof, and isophorone diisocyanate; polyisocyanates such as adducts of these isocyanates with polyvalent alcohols such as trimethylol propane, biurets obtained by reaction the isocyanates with water or isocyanurates which are trimers of the isocyanates: and blocked polyisocyanates obtained by blocking these polyisocyanates with alcohols, lactams, oximes and the like.

The glycidyl group-containing compounds include, for example, epoxy compounds obtained by reaction between glycols such as ethylene glycol, diethylene glycol, triethylene glycol, polyethylene glycol, propylene glycol, dipropylene glycol, tripropylene glycol, polypropylene glycol, 1,4-butanediol, 1,6-hexanediol, neopentyl glycol and the like, and epichlorohydrin; epoxy compounds obtained by reaction between polyhydric alcohols such as glycerine, polyglycerine, trimethylolpropane, pentaerythritol, sorbitol and the like, and epichlorohydrin; and epoxy compounds obtained by reaction between dicarboxylic acid such as phthalic acid, terephthalic acid, oxalic acid, adipic acid and the like, and epichlorohydrin.

The carboxy group-containing compounds include, for example, a variety of aliphatic or aromatic dicarboxylic acids. Poly(meth)acrylic acid and alkali (alkaline earth) metals salts of poly(meth)acrylic acid may also be used.

The oxazoline group-containing compounds include, for example, low molecular weight compounds having two or more oxazoline units. Alternatively, where polymerizable monomers such as isopropenyl oxazoline are used, mention is made of those obtained by copolymerization with acrylic monomers such as (meth)acrylic acid, (meth)acrylic acid alkyl esters, hydroxyalkyl (meth)acrylic acids and the like.

With the anionic polymers, selective reaction between an amine and a functional group may be carried out like silane coupling agents, so that a siloxane bond serving as a crosslinking point is formed. In this case, there may be used γ-glycidoxypropyltrimethoxysilane, γ-glycidoxypropyltriethoxysilane, β-(3,4-epoxycyclohexyl)ethyltrimethoxysilane, γ-chloropropylmethoxysilane, vinyl trichlorosilane, γ-mercaptopropyltrimethoxysilane, γ-aminopropyltriethoxysilane, N-β-(aminoethyl)-γ-aminopropyltrimethoxysilane, γ-isocyanatopropyltriethoxysilane and the like. Of these, an epoxy silane, an aminosilane and an isocyanate silane are preferred when taking the reactivity with an anionic polymer or its copolymer into consideration.

The ratio of these crosslinking agents to the anionic polymer is preferably 1 to 50 parts by mass, more preferably 10 to 20 parts by mass, per 100 parts by mass of the anionic polymer. When the ratio of the crosslinking agent is not less than 1 part by mass per 100 parts by mass of the anionic polymer, the crosslinked structure is likely to be satisfactorily formed. When the ratio of the crosslinking agent is not larger than 50 parts by mass per 100 parts by mass of the anionic polymer, the pot life of the coating solution is improved.

The manner of crosslinking the anionic polymer is not limited to the use of the above-indicated crosslinking agent, but may rely on a method using titanium or a zirconium compound to form ionic crosslinkage.

The cationic polymers include those polymers having an amine. Mention is made of polyethylene imines, ionic polymer complexes made of polyethylene imines and polymers having a carboxylic acid, primary amine-grafted acrylic resins wherein a primary amine is graft-polymerized to an acrylic main skeleton, polyallylamines or derivatives thereof, and cationic polymers such as of aminophenols.

The cationic polymer is preferably used in combination with a crosslinking agent having a functional group capable of reaction with amine/imine, e.g. a carboxy group or a glycidyl group. The crosslinking agents usable in combination with the cationic polymer includes a polymer having a carboxylic acid, which is able to form an ionic polymer complex with a polyethylene imine. For example, mention is made of polycarboxylic acids (salts) such as polyacrylic acid or its ionic salt, or copolymers thereof introduced with co-monomers, polysaccharides having a carboxy group such as carboxymethyl cellulose or its ionic salt. Polyamines include homopolymers or copolymers of allylamine, allylamine amide sulfate, diallylamine, dimethylallylamine and the like. These amines may be in the form of a free amine or one stabilized with acetic acid or hydrochloric acid. As a component for copolymer, maleic acid or sulfur dioxide may be used. Moreover, such a type that a primary amine is partially methoxidized to impart thermal crosslinkability can also be used. Additionally, an aminophenol may also be used. Especially, allylamine or its derivative is preferred.

In the present embodiment, the cationic polymer is described as one constituent element for constituting the corrosion inhibition treatment layer 14. The reason for this is that when intensive studies have been made on a variety of compounds in order that electrolytic solution and hydrofluoric acid resistances required for a packaging material for storage power device are imparted to the material, it has been found that the cationic polymer itself is a compound capable of imparting the electrolytic solution and hydrofluoric acid resistances. This is assumed for the reason that fluorine ions are captured with a cationic group (anion catcher) and thus, the aluminum foil is prevented from being damaged.

The cationic polymer is a more preferred material from the viewpoint of improving adhesiveness. The cationic polymer is soluble in water like the anionic polymer, so that it is more preferred to form a crosslinked structure thereby imparting a water resistance. The crosslinking agent used to form a crosslinked structure of the cationic polymer, such crosslinking agents as illustrated with respect to the anionic polymer can also be used. Where the sol of a rare earth oxide is used for a corrosion inhibition treatment layer, a cationic polymer may be used as the protection layer of the treatment layer in place of the anionic polymer set out before.

The corrosion inhibition treatment layer 14 formed by a chemical conversion treatment, typical of which is a chromate treatment, is one wherein in order to form an inclined structure in association with an aluminum foil, a chemical conversion treatment agent formulated particularly with hydrofluoric acid, hydrochloric acid, nitric acid, sulfuric acid or a salt thereof is used to treat an aluminum foil, followed by further reaction with a chromium or non-chromium compound to form a chemical conversion treatment layer on the aluminum foil. However, because of the use of an acid as a chemical conversion treatment agent, the chemical conversion treatment entails the worsening of a working environment and the corrosion of a coating apparatus. On the other hand, with such a coating-type corrosion inhibition treatment layer 14 as set out before, it is not necessary to form an inclined structure associated with the metal foil layer 13 using an aluminum foil unlike the chemical conversion treatment, typical of which is a chromate treatment. Accordingly, the nature of a coating agent suffers no limitation on acidity, alkalinity and neutrality and thus, a good working environment can be realized. Additionally, in view of the fact that a substitute for the chromate treatment using a chromium compound has been demanded from the standpoint of environmental hygiene, a coating-type corrosion inhibition treatment layer 14 is preferred.

In view of the above discussion, combinations of the above-stated coating-type corrosion inhibition treatments include those using (1) only a sol of a rare earth oxide, (2) an anionic polymer alone, (3) a cationic polymer alone, (4) a sol of a rare earth oxide+an anionic polymer (composite lamination), (5) a sol of a rare earth oxide+a cationic polymer (composite lamination), (6) (a sol of a rare earth oxide+an anionic polymer: composite lamination)/a cationic polymer (multilayering), (7) (a sol of a rare earth oxide+a cationic polymer: composite lamination)/an anionic polymer (multilayering), and the like. Of these, (1) and (4) to (7) are preferred, of which (4) to (7) are more preferred. In this regard, however, the present embodiment should not be construed as limited to the above combinations. For instance, as an example of selection of the corrosion inhibition treatments, it may be possible to design such that because a cationic polymer is a very preferred material in that it shows good adhesion with a modified polyolefin resin that will be illustrated with respect to a sealant adhesion layer (a sealant layer or second adhesive layer) appearing hereinafter, so that where the sealant layer is formed of such a modified polyolefin resin, a cationic polymer is provided on a contact surface of the sealant adhesion layer (e.g. configurations (5) and (6)).

The corrosion inhibition treatment layer 14 is not limited to such a layer as set out above. For instance, the layer may be formed by using a treating agent obtained by formulating phosphoric acid and a chromium compound in a resin binder (such as an aminophenol or the like) as with the case of a coating-type chromate treatment of a known technique. When using this treating agent, a layer having both a corrosion inhibition function and adhesiveness can be provided. Additionally, although the stability of a coating solution should be taken into account, there may also be provided a layer having both a corrosion inhibition function and adhesiveness when using a coating agent wherein a sol of a rare earth oxide and a polycationic polymer or a polyanionic polymer has been prepared in the form of a one-pack solution beforehand.

The mass per unit area of the corrosion inhibition treatment layer 14, in either a multilayer structure or a single layer structure, is preferably 0.005 to 0.200 $g/m^2$, more preferably 0.010 to 0.100 $g/m^2$. When the mass per unit area is not less than 0.005 $g/m^2$, the corrosion inhibition function is likely to be imparted to the metal foil layer 13. When the mass per unit area exceeds 0.200 $g/m^2$, the corrosion inhibition function remains substantially unchanged. On the other hand, where the sol of a rare earth oxide is used and the resulting film is thick, curing by application of heat upon drying becomes insufficient, with concern that the lowering of coagulation force may occur. It will be noted that the thickness of the corrosion inhibition treatment layer 14 can be calculated from specific density.

<Sealant Layer 15>

The sealant layer 15 is one that imparts heat sealability to the packaging material 10. The constituent material of the sealant layer 15 includes, for example, a polyolefin resin or an acid-modified polyolefin resin. It is to be noted that when the sealant layer 15 of the packaging material 10 (i.e. a configuration having no second adhesive layer 17 appearing hereinafter: thermal lamination) is in the form of a single layer, an acid-modified polyolefin resin (SPP) is preferably used. On the other hand, when the sealant layer 15 is formed as a multilayer, it is preferred to use an acid-modified polyolefin resin at least at a contact side with the metal foil layer 13 located at the outermost side. In the other layers, either a polyolefin resin or an acid-modified polyolefin resin may be used. In contrast, with the case of a packaging material 20 described hereinafter (i.e. a configuration having a second adhesive layer 17: dry lamination), either a polyolefin resin or an acid-modified polyolefin resin may be used for all the layers irrespective of the layer configuration (single layer or multilayer) of the sealant layer 15.

The acid-modified polyolefin resin is one obtained by introducing an acidic group into a polyolefin resin. The acidic group includes a carboxy group, a sulfone group or the like, of which a carboxy group is preferred. The acid-modified polyolefin resin obtained by introducing a carboxy group into a polyolefin resin includes, for example, one wherein a polyolefin resin is subjected to graft modification with an unsaturated carboxylic acid or its acid anhydride, or an ester of an unsaturated carboxylic acid or its acid anhydride in the presence of a radical initiator. Hereinafter, the unsaturated carboxylic acid or its acid anhydride, or the ester of an unsaturated carboxylic acid or its acid anhydride may be referred to collectively as grafting compound.

It will be noted that the polyolefin resin includes low density polyethylene, medium density polyethylene, high density polyethylene, ethylene-α-olefin copolymer homopolypropylene, blocked polypropylene, random polypropylene, propylene-α-olefin copolymer and the like.

The unsaturated carboxylic acids include acrylic acid, methacrylic acid, maleic acid, fumaric acid, itaconic acid, citraconic acid, tetrahydrophthalic acid, bicyclo[2,2,1] hepto-2-ene-5,6-dicarboxylic acid and the like. The unsaturated carboxylic acid anhydrides include maleic anhydride, itaconic anhydride, citraconic anhydride, tetrahydrophthalic anhydride, bicyclo[2,2,1]hepto-2-ene-5,6-dicarboxylic anhydride and the like. The esters of unsaturated carboxylic acids or anhydrides thereof include methyl acrylate, methylmethacrylate, ethyl methacrylate, butyl methacrylate, dimethyl maleate, monomethyl maleate, diethyl fumarate, dimethyl itaconate, diethyl citraconate, dimethyl tetrahydrophthalate anhydride, dimethyl bicyclo[2,2,1-] hepto-2-ene-5,6-dicarboxylate and the like.

The ratio of the grafting compound in the acid-modified polyolefin resin is preferably 0.2 to 100 parts by mass per 100 parts by mass of the polyolefin resin. The temperature conditions of the grafting reaction are preferably 50 to 250° C., more preferably 60 to 200° C. The reaction time differs depending on the manner of production. With a melt grafting reaction using a biaxial extruder, the reaction time is preferably within a residence time in the extruder. More particularly, it is preferably 2 to 30 minutes, more preferably 5 to 10 minutes. The grafting reaction may be carried out under normal pressure conditions or under pressure conditions.

The radical initiators include organic peroxides. Examples of the organic peroxide include alkyl peroxides, aryl peroxides, acyl peroxides, ketone peroxides, peroxy ketals, peroxy carbonates, peroxy esters, hydroperoxides and the like. These organic peroxides can be appropriately selected depending on the temperature conditions and the reaction time. With the melt grafting reaction using a biaxial extruder, alkyl peroxides, peroxy ketals and peroxy esters are preferred, and more preferred ones include di-t-butyl peroxide and 2,5-dimethyl-2,5-di-t-butyl peroxy-hexine-3, and dicumyl peroxide.

A preferred acid-modified polyolefin resin is a polyolefin resin modified with maleic anhydride. For example, "Admer", manufactured by Mitsui Chemical, Inc., and "Modic", manufactured by Mitubishi Chemical Corporation, are appropriately used. These acid-modified polyolefin components are better in reactivity with a variety of metals and polymers having various functional groups, so that they can impart adhesion to the sealant layer 15 by use of the reactivity, thereby enabling an electrolytic solution resistance to be improved.

The sealant layer 15 contains an inorganic filler 16. The inorganic filler 16 should have characteristic properties such as insulating properties, a resistance to electrolytic solution, a heat resistance (heat countermeasure during heat sealing), hardness (pressure countermeasure during heat sealing), an acid resistance (countermeasure against hydrogen fluoride generated by reaction between an electrolytic solution and water) and the like, and should preferably having thermal conductivity (with which low temperature heat sealing is feasible, and a heat radiation performance as a battery can be expected).

The inorganic filler 16 is one made of aluminum oxide, silicon oxide, magnesium oxide, zirconium oxide, calcium carbonate, zirconium silicate, zinc oxide, titanium oxide, tin oxide, iron oxide, antimony oxide, boron nitride, aluminum nitride, silicon nitride or the like. Of these, aluminum oxide or born nitride is preferred from the standpoint of resistances to electrolytic solution, acid and heat, hardness and thermal conductivity.

It will be noted that the inorganic filler 16 is defined as including a primary filler (single filler) and a secondary filler (coagulated filler). The shape of the inorganic filler 16 (shape of a single filler) is not specifically limited, and fillers in the form of sphere, plate, needle, fibers, column, amorphousness or the like can be appropriately used. For example, where a spherical filler is adopted as the inorganic filler 16, its average primary particle diameter can be approximately from 0.5 to 20 μm.

More preferably, the inorganic filler 16 should be surface treated. When the inorganic filler 16 is surface treated with a silane coupling agent, the adhesion between the resin forming the sealant layer 15 and the inorganic filler is enhanced, so that the resin fluidity upon melting can be more lowered. In doing so, even where heat or pressure is imposed during heat sealing, the flow of the resin can be suppressed, thus leading to the prevention of short-circuiting. It will be noted that the surface treatment may be further advantageous in that the inorganic filler 16 is likely to be prevented from coming off from the sealant layer 15.

In the present embodiment, the occupying ratio of the inorganic filler 16 relative to the total thickness of the sealant layer 15 is 5 to 50% in the section along the lamination direction of the packaging material for power storage device. This enables good insulation to be maintained if the sealant layer 15 is made thin. The reason for this is briefly described below.

The application of heat or pressure at the time of heat sealing in the course of fabrication of a power storage device results in the occurrence of melting and crushing of the sealant layer 15. For instance, with top sealing, the occurrence of melting or crushing of the sealant layer 15 makes the distance between a tab lead and the metal layer closer, with the likelihood of causing short-circuiting. In contrast, when a given amount of the inorganic filler 16 is present in the sealant layer 15, the melting or crushing of the sealant layer 15 is less likely to occur even when heat or pressure is exerted on the layer, so that the distance between the tab lead and the metal layer can be created above a given level. Hence, the occurrence of short-circuiting can be suppressed.

As the sealant layer 15 is made thinner, the resistance of the layer itself becomes smaller, so that insulation is liable to be lowered due to a variation in layer thickness and some cracks. Especially, it has been confirmed that short-circuiting is considered to be influenced by a variation in layer thickness at the time of heat sealings (top sealing, side sealing and degassing heat sealing). When the inorganic filler 16 is added, it plays a role of keeping a gap and can suppress the resin flow by intermolecular interaction upon melting at the time of heat sealing.

It will be noted that if the occupying ratio of the inorganic filler 16 relative to the total thickness of the sealant layer 15 is less than 5%, its role as a spacer becomes insufficient and thus, the tab lead and the metal layer come closer to each other, with some concern that short-circuiting occurs. On the contrary, when the ratio is larger than 50%, the content of the becomes so large that difficulty is involved in forming the sealant layer 15 and interlayer adhesion lowers because of a reduced contact area. Additionally, heat seal strength can also lower. From the above viewpoint, the ratio is more preferably 20 to 30%.

When based on the total mass of the sealant layer 15, the content of the inorganic filler 16 is preferably 5 to 35 mass %. If the content is less than 5 mass %, the role as a spacer becomes insufficient, and the tab lead and the metal layer come closer to each other, with concern that short-circuiting occurs. If the content is too small, the viscosity for the sealant layer 15 may become liable to lower, with the tendency that difficulty is involved in controlling fluidity. On the other hand, when the content is larger than 35 mass %, a contact area becomes so small that adhesiveness is liable to lower. Moreover, heat seal strength can more easily lower and the viscosity for the sealant layer 15 becomes too high, with the tendency that film forming processability is liable to lower. From this point of view, the content of the inorganic filler 16 is more preferably 15 to 25 mass %.

The sealant layer 15 may be either a single layer film, or a multilayer film wherein a plurality of layers are stacked. Although depending on a required function, there may be used, for example, a multilayer film, in which a resin such as an ethylene-cyclic olefin copolymer or polymethylpentene is interposed, from the standpoint of imparting moisture proofness.

In the present embodiment, it is preferred that the sealant layer 15 is constituted of two or more layers, at least one of which is free of the inorganic filler 16. When the sealant layer 15 is formed of a multilayer including two or more layers, the layer that is free of the inorganic filler 16 is able to develop insulation without lowering the inherent characteristics of the sealant layer 15 as would otherwise occur by the addition of the inorganic filler 16.

The thickness of the layer containing the inorganic filler 16 is preferably not less than 50% of the total thickness of the sealant layer 15. If the thickness of the layer containing the inorganic filler is less than 50% of the total thickness of the sealant layer 15, the resin flow is liable to occur by the application of heat or pressure during heat sealing, with the tendency that short circuiting is likely to occur. Accordingly, the ratio is more preferably not less than 60%. It will be noted that in order to enjoy such merits by the formation of the sealant layer 15 in the form of a multilayer, or by the provision of a layer that is free of an inorganic filler, the upper limit of the ratio can be at 90%.

In the case where the sealant layer 15 is formed of two or more layers, it is preferred that a layer containing the inorganic filler 16 is sandwiched between inorganic filler 16-free layers (e.g. an intermediate layer of a three-layer structure). In doing so, insulation can be developed without impairing the adhesion with the metal foil layer 13 and the heat sealing characteristics. It will be noted that where the sealant layer 15 is formed, for example, to have such a three-layer structure as mentioned above, it is as a matter of fact that a layer containing the inorganic filler 16 can be disposed at an outermost layer side or at an innermost layer side. This tends that in the former case, adhesion with the metal foil layer 13 may be liable to lower and in the latter case, seal strength may be liable to lower.

Where the sealant layer 15 is formed of two or more layers, the respective layers can be independently formed by appropriate use of the respective components set out hereinabove. More particularly, the constituent resin materials of the respective layers may be the same or different, and the thicknesses of the respective layer may also be the same or different. In this regard, however, a layer containing at least the inorganic filler 16 should preferably be a layer made of an acid-modified polyolefin from the viewpoint that adhesion with the inorganic filler 16 is better enhanced and low fluidity is more easily ensured even when heat or pressure is exerted thereon during heat sealing.

The sealant layer 15 may be formulated with a variety of additives such as, for example, a flame retardant, a slipping agent, an anti-blocking agent, an antioxidant, a light stabilizer, a tackifier and the like.

The thickness of the sealant layer 15 is preferably 10 to 100 μm, more preferably 20 to 50 μm. Where the sealant layer 15 is formed as a multilayer, the total of thicknesses (total thickness) of the respective layers is preferably within a range indicated above.

Preferred embodiments of the packaging material for power storage device of the invention have been described above in detail. The present invention should not be construed as limited to such specific embodiments and many variations and alterations may be possible within the spirit and scope of the invention as set forth in appended claims.

For example, although the corrosion inhibition treatment layer 14 is formed on the sealant layer 15 side surface of the metal foil layer 1 in FIG. 1, the corrosion inhibition treatment layer 14 may be formed on the adhesive layer 12 side surface of the metal foil layer 13, or may be formed on opposite surfaces of the metal foil layer 13. Where formed on the opposite surfaces of the metal foil layer 13, the corrosion inhibition treatment layer 14 formed on the first adhesive layer 12 side of the metal foil layer 13 and the corrosion inhibition treatment layer 14 formed on the sealant layer 15 side of the metal foil layer 13 may be the same or different in formulation.

In FIG. 1, there is shown the case that the metal foil layer 13 and the sealant layer 15 (via the corrosion inhibition treatment layer 14) are directly stacked. However, as with the case of a packaging material 20 for power storage device shown in FIG. 2, the metal foil layer 13 and the sealant layer 15 may be stacked via a second adhesive layer 17. The second adhesive layer 17 is now described below.

<Second Adhesive Layer 17>

The second adhesive layer 17 is a layer that bonds the metal foil layer 13 having been formed with the corrosion inhibition treatment layer 14 thereon and the sealant layer 15 together. An ordinary adhesive capable of bonding the metal foil layer 13 and the sealant layer 15 together can be used for the second adhesive layer 17.

Where the corrosion inhibition treatment layer 14 has a layer containing at least one type of polymer selected from the group consisting of such a cationic polymer and an anionic polymer as set out above, the second adhesive layer 17 is preferably one that contains a compound reactive (which may be referred to hereinafter as reactive compound) with the polymer contained in the corrosion inhibition treatment layer 14.

For example, where the corrosion inhibition treatment layer 14 contains a cationic polymer, the second adhesive layer 17 contains a reactive compound with the cationic polymer. Where the corrosion inhibition treatment layer 14 contains an anionic polymer, the second adhesive layer 17 contains a reactive compound with the anionic polymer. Moreover, where the corrosion inhibition treatment layer 14 contains both a cationic polymer and an anionic polymer, the second adhesive layer 17 contains both a compound reactive with the cationic polymer and a compound reactive with the anionic polymer. In this regard, however, the second adhesive layer 17 does not always need to contain the above two types of compounds, but may contain a compound having reactivity with both the cationic polymer and the anionic polymer. The term "having reactivity" used herein means to form a covalent bond with a cationic polymer or an anionic polymer. The second adhesive layer may further contain an acid-modified polyolefin resin.

The compound having reactivity with a cationic polymer includes at least one compound selected from the group consisting of a polyfunctional isocyanate compound, a glycidyl compound, a compound having a carboxy group, and a compound having an oxazoline group.

These polyfunctional isocyanate compound, glycidyl compound, carboxy group-containing compound and oxazoline group-containing compound include such polyfunctional isocyanate compounds, glycidyl compounds, carboxy group-containing compounds and oxazoline group-containing compounds previously exemplified as a crosslinking agent used to form a crosslinked structure of a cationic polymer. Of these, the polyfunctional isocyanate compound is preferred because of its high reactivity with cationic polymers and the likelihood of forming a crosslinked structure.

The compound having reactivity an anionic polymer includes at least one compound selected from the group consisting of a glycidyl compound and a compound having an oxazoline group. The glycidyl compound and the compound having an oxazoline group include glycidyl compounds and oxazoline group-containing compounds previously exemplified as a crosslinking agent used to form a crosslinked structure of a cationic polymer. Of these, the glycidyl compound is preferred because of its high reactivity with anionic polymers.

Where the second adhesive layer 17 contains an acid-modified polyolefin resin, the reactive compound should preferably have reactivity with an acidic group of the acid-modified polyolefin resin (i.e. by forming a covalent bond with the acidic group). This enables the adhesion with the corrosion inhibition treatment layer to be more enhanced. Additionally, the acid-modified polyolefin resin becomes crosslinked in structure, thus leading to a more improved solvent resistance of the packaging material 20.

The content of the reactive compound is preferably from one to 10 times the amount of the acidic group of the acid-modified polyolefin resin. If equal to or over, the reactive compound is able to satisfactorily react with the acidic group of the acid-modified polyolefin resin. On the other hand, when exceeding ten times the amount, the crosslinked structure with the acid-modified polyolefin resin becomes insufficient, with concern that physical properties such as a solvent resistance as mentioned above are lowered.

The acid-modified polyolefin resin is one wherein an acidic group is introduced into a polyolefin resin. The acid group includes a carboxy group, a sulfone group or the like, of which a carboxy group is preferred. As an acid-modified polyolefin resin, those exemplified as a modified polyolefin used for the sealant layer can be likewise used.

The second adhesive layer 17 may be further formulated with various additives including a flame retardant, a slipping agent, an anti-blocking agent, an antioxidant, a light stabilizing agent, a tackifier and the like.

It will be noted that ordinary adhesives used to bond the metal foil layer 13 and the sealant layer 15 together may sometimes contain a silane coupling agent. This is because bonding is facilitated by formulating a silane coupling agent, thereby enhancing adhesion strength. However, when an adhesive formulated with a silane coupling agent is used, components other than the silane coupling agent, which are contained in the adhesive layer, undergo side reactions with the silane coupling agent although depending on the type of functional group contained in the silane coupling agent, with some concern that an inherently intended crosslinking reaction may be subject to adverse effect. To avoid this, it is preferred that no silane coupling agent is contained in the adhesive used to bond the metal foil layer 13 and the sealant layer 15 together.

Since the second adhesive layer 17 contains such a reactive compound as set out above, it forms a covalent bond with the polymer of the corrosion inhibition treatment layer 14, thereby leading to improved adhesion strength between the corrosion inhibition treatment layer 14 and the second adhesive layer 17. Accordingly, it is unnecessary to formulate a silane coupling agent in the second adhesive layer 17 for the purpose of promoting the adhesion, so that it is preferred that no silane coupling agent is contained in the second adhesive layer 17.

The thickness of the second adhesive layer 17 is preferably 3 to 50 μm, more preferably 3 to 10 μm. If the thickness of the second adhesive layer 17 is not less than the lower limit value, improved or even excellent adhesion is more easily obtained. If the thickness of the second adhesive layer 17 is not larger than the upper limit value, the quantity of moisture transmitted from side end faces of a packaging material is reduced.

The configuration of the packaging material 20 for power storage device other than the second adhesive layer 17 is similar to the packaging material 10 for power storage device. It will be noted that the thickness of the sealant layer 15 of the packaging material 20 for power storage device is adjusted depending on the thickness of the second adhesive layer 17. The thickness of the sealant layer 15 of the packaging material 20 for power storage device is not specifically limited and is preferably within a range of 5 to 100 μm, more preferably 10 to 80 μm.

[Method of Producing a Packaging Material]

Next, an example of a method of producing a packaging material 10 shown in FIG. 1 is illustrated. It will be noted that the method of producing the packaging material 10 should not be construed as limited to the following method.

A method of producing a packaging material 10 of the present embodiment generally includes the steps of stacking a corrosion inhibition treatment layer 14 on a metal foil layer 13, bonding a substrate layer 11 and the metal foil layer 13 together, further stacking a sealant layer 15 to provide a laminate, and thermally treating the thus obtained laminate, if necessary.

(Lamination Step of the Corrosion Inhibition Treatment Layer 14 on the Metal Foil Layer 13)

This step is one wherein the corrosion inhibition treatment layer 14 is formed on the metal foil layer 13. As stated before, the method is one wherein the metal foil layer 13 is subjected to defatting treatment, hot water conversion treatment, anodization treatment or chemical conversion treatment, or is coated with a coating agent having a corrosion inhibition performance.

Where the corrosion inhibition treatment layer 14 is in the form of a multilayer, a coating solution (coating agent) for a corrosion inhibition treatment layer at the lower layer side (i.e. metal foil layer 13 side) is coated onto the metal foil layer 13 and baked to form a first layer. Thereafter, a coating solution (coating agent) for a corrosion inhibition treatment layer at the upper layer side is coated onto the first layer and baked to form a second layer. The second layer may be formed in the stacking step of the sealant layer 15 described hereinafter.

The defatting treatment may be carried out by a spraying or an immersion method. The hot water conversion treatment and anodization treatment may be carried out by an immersion method, and the chemical conversion treatment may be carried by appropriately selecting an immersion method, a spraying and a coating method depending on the type of chemical conversion treatment.

The method of coating a coating agent having a corrosion inhibition performance can be performed by use of various methods such as gravure coating, reverse coating, roll coating, bar coating and the like.

As stated above, such a variety of treatments may be carried out on both surfaces or one surface of the metal foil layer 13. With the one-surface treatment, a surface to be treated is preferably at a side on which the sealant layer 15 is to be stacked. It will be noted that the substrate layer 11 may also be subjected to such treatments as mentioned above on the surface thereof.

The amounts of the coating agents for forming the first and second layers are preferably both 0.005 to 0.200 $g/m^2$, more preferably 0.010 to 0.100 $g/m^2$.

If necessary, dry curing may be carried out within a base material temperature range of 60 to 300° C. depending on the drying conditions of the corrosion inhibition treatment layer 14 used.

(Step of Bonding Between the Substrate Layer 11 and the Metal Foil Layer 13)

This step is one wherein the metal foil layer 13 provided with the corrosion inhibition treatment layer 14 and the substrate layer 11 are bonded together through the first adhesive layer 12. The bonding method makes use of the techniques of dry lamination, non-solvent lamination, wet lamination and the like thereby bonding the both layers via such a constituent material of the first adhesive layer 12 as set out before. The dry coating amount of the first adhesive layer 12 is within a range of 1 to 10 $g/m^2$, preferably 3 to 7 $g/m^2$.

(Lamination Step of the Sealant Layer 15)

This step is one wherein the sealant layer 15 is formed on the corrosion inhibition treatment layer 14 formed by the preceding step. A procedure for this includes one wherein the sealant layer 15 is sandwich-laminated by an extruder lamination machine. Moreover, the sealant layer 15 may be stacked by extrusion with a tandem lamination method or a co-extrusion method.

According to this step, there can be obtained a laminate wherein the respective layers of substrate layer 11/first adhesive layer 12/metal foil layer 13/corrosion inhibition treatment layer 14/sealant layer 15 are stacked in this order as shown in FIG. 1.

In the case of the formation of the corrosion inhibition layer 14 having a multilayer structure, if an extruder laminator is provided with a unit capable of coating an anchor coat layer, a second layer of the corrosion inhibition treatment layer 14 may be coated with that unit.

(Thermal Treatment Step)

This step is one wherein the laminate is thermally treated. The thermal treatment of the laminate enables the adhesion between metal foil layer 13/corrosion inhibition treatment layer 14/sealant layer 15 to be improved, so that more improved or even excellent resistances to electrolytic solution and hydrofluoric acid can be imparted. Moreover, there can be obtained such an effect that the generation of a whitening phenomenon during molding can be suppressed while suppressing the crystallization of the sealant layer 15 from proceeding. Accordingly, in this step, it is preferred to carry out the thermal treatment to such an extent that the adhesion between the respective layers is improved, but the crystallization of the sealant layer 15 is not promoted. The thermal treatment temperature depends on the type of constituent material of the sealant layer 15. Only as a guide, it is preferred to carry out the thermal treatment in such a way that the maximum arrival temperature of the laminate is higher by 20 to 100° C. than a melting point of the sealant layer 15, more preferably by 20 to 60° C. than the melting point of the sealant layer 15. If the maximum arrival temperature of the laminate is lower than this range, crystal nuclei remain with the likelihood that crystallization is promoted. On the other hand, when the maximum arrival temperature exceeds the range, thermal expansion of the metal foil, or thermal shrinkage of the substrate layer after bonding takes place, for example, with the possibility that processability or characteristic properties lower. Accordingly, although depending on the treating temperature, the thermal treatment time is favorably as short as possible (e.g. less than 30 seconds).

As to cooling, quick cooling is preferred so as to suppress crystallization. The cooling rate is preferably approximately 50 to 100° C./second.

In this way, there can be produced a packaging material 10 for power storage device as shown in FIG. 1.

Figure 2:
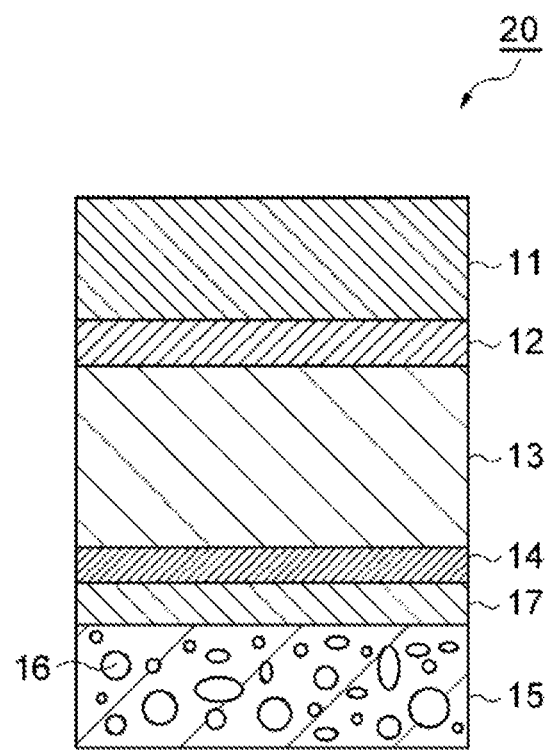
FIG. 2 is a schematic sectional view of a packaging material for power storage device according to another embodiment of the invention.

Next, an example of a method of producing a packaging material 20 shown in FIG. 2 is illustrated. It will be noted that the method of producing the packaging material 20 should not be construed as limited to the following method.

The method of producing a packaging material 20 of the present embodiment generally includes the steps of stacking a corrosion inhibition treatment layer 14 on a metal foil layer 13, bonding a substrate layer 11 and the metal foil layer 13 together, further stacking a sealant layer 15 through a second adhesive layer 17 to obtain a laminate, and, if necessary, subjecting the thus obtained laminate to aging treatment. It will be noted that the steps up to the step of bonding between the substrate layer 11 and the metal foil layer 13 can be carried out in the same manner as those of the afore-stated method of producing the packaging material 10.

(Lamination Step of the Second Adhesive Layer 17 and the Sealant Layer 15)

This step is one wherein the sealant layer 15 is bonded to the corrosion inhibition layer 14 side of the metal foil layer 13 through the second adhesive layer 17. The manner of the bonding includes a wet process.

With the wet process, a solution or dispersion of a constituent adhesive of the second adhesive layer 17 is coated onto the corrosion inhibition treatment layer 14, followed by removing the solvent at a given temperature (at a temperature not lower than a melting point of an acid-modified polyolefin resin if the adhesive contains such a resin) and baked. Thereafter, the sealant layer 15 is stacked to produce a packaging material 20. The coating method includes those various coating methods previously exemplified.

(Aging Treatment Step)

This step is one wherein the laminate is subjected to aging treatment. The aging treatment of the laminate enables the adhesion between metal foil layer 13/corrosion inhibition treatment layer 14/second adhesive layer 17/sealant layer 15 to be promoted. The aging treatment can be effected within a range of room temperature to 100° C. The aging time is, for example, 1 to 10 days.

In this manner, there can be produced the packaging material 20 of the present embodiment as shown in FIG. 2.

As stated above, the preferred embodiments of packaging materials for power storage device and their production methods of the present invention have been described in detail. The present invention should not be construed as limited to such specific embodiments and may be variously modified and altered within the scope of the invention set forth in the appended claims.

The packaging material for power storage device of the present invention can be conveniently used as a packaging material for power storage devices including, for example, secondary batteries such as a lithium ion battery, a nickel hydrogen battery and a lead storage battery, and electrochemical capacitors such as an electric double layer capacitor. Of these, the packaging material for power storage device of the invention is suited as a packaging material for lithium ion batteries.

Second Embodiment

[Packaging Material for Power Storage Device]

Figure 3:
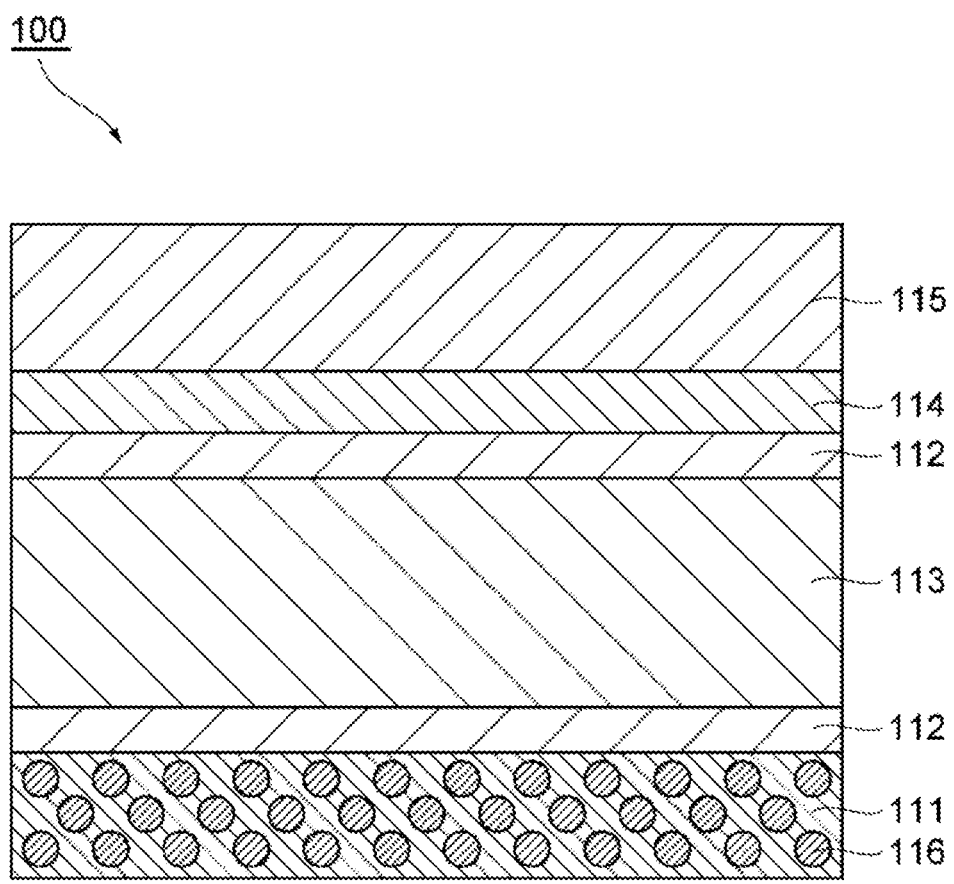
FIG. 3 is a sectional view of a packaging material for power storage device according to a further embodiment of the invention.

A packaging material for power storage device (packaging material for secondary battery) related an embodiment of the invention is now described with reference to the accompanying drawings. Initially, as shown in FIG. 3, a packaging material 100 for power storage device of the present embodiment is configured to include, at least, a substrate layer 115, a barrier layer 113, and a sealant layer 111 in this order. The barrier layer 113 is made of a metal foil and has a corrosion inhibition treatment layer 112 at the sealant layer 111 side, and the sealant layer 111 is formed directly on the corrosion inhibition treatment layer 112. More particularly, the packaging material 100 for power storage device of the present embodiment is constituted of a laminate having at least the substrate layer 115 formed over one surface (second surface) of the barrier layer 113 and also having, on the other surface (first surface) of the barrier layer 113 at a side opposite to the substrate layer 115, the sealant layer 111 directly formed, not via an adhesive layer, on the corrosion inhibition treatment layer 112 formed on the barrier layer 113. It will be noted that as shown in the figure, the corrosion inhibition treatment layer 112 may be formed at a substrate layer side of the barrier layer 113. The substrate layer 115 may be bonded with the barrier layer 113 through a substrate adhesive layer 114.

The packaging material 100 for power storage device is configured such that the substrate layer 115 is arranged as an outermost layer and the sealant layer 111 is arranged as an innermost layer. That is, the packaging material 100 for power storage device is used in such a way that the substrate layer 115 is arranged on an outer side of a power storage device and the sealant layer 111 is arranged on an inner side of the power storage device.

The respective constituent layers of the packaging material 100 for power storage device is described in detail.

<Sealant Layer 111>

The sealant layer 111 is a layer that imparts heat sealability to the packaging material 100 for power storage device. The sealant layer 111 is formed of a certain type of resin and is formed directly and not via an adhesive on the corrosion inhibition treatment layer 115 at a surface (first surface) of the barrier layer 113 opposite to the substrate layer 115. Such a sealant layer 111 can be formed by applying or coating a resin material for the sealant layer 111 onto the corrosion inhibition treatment layer 112 formed on the barrier layer 113.

The resin used to form the sealant layer 111 includes polyolefin resins. In this regard, however, in order to enhance the adhesion with the barrier layer 113, there are preferably used acid-modified polyolefin resins wherein acids such as unsaturated carboxylic acids or anhydrides thereof are graft-modified to polyolefin resins. The polyolefin resins include low density, middle density or high density polyethylene, homo, block or random polypropylene and the like. The resin used for forming the sealant layer 111 is preferably heat-resistant polypropylene.

The polypropylene includes those obtained by random copolymerization of polypropylene with 1 to 10 mol % of other types of α-olefins such as, for example, ethylene, 1-butene, isobutene, 1-pentene, 2-methyl-1-butene, 3-methyl-1-butene, 1-hexene, 3-methyl-1-pentene, 2-methyl-1-pentene, 1-heptene and the like. The unsaturated carboxylic acids or anhydrides thereof to be grafted include unsaturated monocarboxylic acids such as acrylic acid, methacrylic acid and the like, unsaturated dicarboxylic acids such as maleic acid, fumaric acid, itaconic acid, citraconic acid, allylsuccinic acid, mesaconic acid, glutaconic acid, nadic acid, methyl nadic acid, tetrahydrophthalic acid, methyl hexahydrophthalic acid and the like, and unsaturated dicarboxylic anhydrides such as maleic anhydride, itaconic anhydride, citraconic anhydride, allysuccinic anhydride, glutaconic anhydride, nadic anhydride, methyl nadic anhydride, tetrahydrophthalic anhydride, methyl tetrahydrophthalic anhydride and the like. A mixed component of two or more of these components may be used for the graft modification. Of these unsaturated carboxylic acids and acid anhydrides thereof, maleic acid, maleic anhydride, nadic acid or nadic anhydride is preferably used.

Any known methods can be adopted as the graft modification method. For example, the graft modification is performed by adding such polypropylene and an unsaturated carboxylic acid as indicated above and a radical initiator to a solvent, followed by heating to high temperature.

The resin used for the sealant layer 111 is preferably one which does not come loose when a battery element accommodated in a power storage device assumes heat and assures good heat sealability. From this point of view, it is preferred that the sealant layer is formed of a resin whose melting point is 100 to 165° C. (measured by differential thermoanalysis). It will be noted that from the standpoint of a heat resistance and productivity, the melting point is more preferably 120 to 160° C.

The sealant layer 111 may further comprise various additives such as a slipping agent, an anti-blocking agent, an antistatic agent, a nucleating agent, a pigment, a dye and the like. These additives may be used singly or in combination of two or more.

The resin (coating solution) used for the sealant layer 111 is one wherein such a polyolefin resin as indicated above is dispersed in an organic solvent in solid form. Usable organic solvents include, for example, aromatic hydrocarbons such as toluene, xylene and the like, alicyclic hydrocarbons such as cyclohexane, methyl cyclohexane and the like, and aliphatic hydrocarbons such as hexane, heptane, decane and the like. In order to achieve stable storage, there may be added poor solvents such as alcohols, ketones, ethers, acid anhydrides, esters, cellosolves and the like. Examples of the poor solvent include methanol, ethanol, propanol, butanol, pentanol, hexanol, propanediol, phenol, water, diethyl ether, dipropyl ether, dibutyl ether, anisole, dioxane, tetrahydrofuran, acetone, methyl ethyl ketone, methyl isobutyl ketone, pentanone, hexanone, isophorone, acetophenone, acetic anhydride, methyl acetate, ethyl acetate, butyl acetate, methyl propionate, butyl formate, ethyl cellosolve, methyl cellosolve, and the like.

The sealant layer 111 is formed directly and not via an adhesive on the corrosion inhibition treatment layer 112 at a surface (first surface) opposite to the surface of the barrier layer 113, over which the substrate layer 115 is stacked, according to a known coating method such as direct gravure coating, offset gravure coating, bar coating or the like although not limited thereto. The packaging material 100 for power storage device obtained in this way is folded back toward the sealant layer 111 side so that the portions of the sealant layer 111 are facing each other, followed by heat sealing the end portions of the sealant layer 111 at a melting temperature or over to hermetically seal a battery element of a power storage device.

The thickness of the sealant layer 111 is 5 to 30 μm. If the layer thickness becomes smaller, there is the tendency that pinholes are liable to occur in the sealant layer 111, or electric insulation lowers and adhesion failure during heat sealing occurs. On the other hand, when the layer thickness is made larger, material costs become high. From this point of view, the thickness is preferably 7 to 20 μm.

<High Melting Point Material 116>

As shown in FIG. 3, a high melting point material 116 is contained in the sealant layer 111. It will be noted that although the high melting point material 116 is schematically shown as spheres in FIG. 3, the shape is not always limited to sphere. The high melting point material 116 is made of a filler, glass fibers, non-woven fabrics or the like, of which the filler is preferred from the standpoint of the shape, size and dispersability in a sealant resin.

As the high melting point material 116, there are used inorganic particles such as of aluminum oxide ($Al_2O_3$), silicon oxide ($SiO_2$), magnesium oxide (MgO), glass and like, and organic particles (heat-resistant particles) such as of nylons, epoxy resins and the like.

Although no specific limitation is placed on the type of high melting point material 116 so far as it is not melted during heat sealing, those having a melting point of not lower than 220° C. are preferred. It is to be noted that in order to suppress the melting under heat sealing temperature conditions, ones having a melting point of not lower than 250° C. are more preferred. It will also be noted that although not specifically limited, the upper limit of the melting point can be at approximately 2050° C.

The high melting point material 116 may be subjected to surface treatment with a silane coupling agent so as to enhance adhesion with a resin forming the sealant layer.

The high melting point material 116 is such that if its average particle size is too small, the layer thickness of the sealant layer 111 cannot be held during heat sealing thereby lowering electric insulation, and if the average particle size becomes too large, the layer thickness of the sealant layer 111 has to be made large sufficient to ensure heat sealability, thus being disadvantageous in thinning. Accordingly, the average particle size is preferably 30 to 80%, more preferably 40 to 70%, of the thickness of the sealant layer. Alternatively, the average particle size is preferably 1.5 to 24 μm, more preferably 2.8 to 14 μm. The average particle size of the high melting point material 116 can be measured, for example, by laser diffraction or a scattering method.

The number (content) of the high melting material 116 per unit volume of the sealant layer 111 is smaller than 100 particles/$cm^3$, the electric insulation at the heat-sealed end portion is liable to lower, resulting in short-circuiting. If the number exceeds 15,000,000 particles/$cm^3$, the heat sealing force may lower. Accordingly, the number of the high melting point material 116 per unit volume of the sealant layer 111 is preferably 100 to 15,000,000 particles/$cm^3$, more preferably 10,000 to 10,000,000 particles/$cm^3$. The number of the high melting point material per unit volume of the sealant layer 111 can be measured using X-ray CT. More particularly, the sealant layer 111 of a coated laminate film is cut into a piece having a size of 10 $m^2$×a coated film thickness, followed by stereoimage formation with X-ray CT photography and binarization of the stereoimage with respect to its high melting material and coated resin. Thereafter, the high melting material alone is extracted from the binarized data and its number is counted to calculate the number per unit volume. Thus, the number of the high melting point material 116 can be measured.

<Corrosion Inhibition Treatment Layer 112>

The corrosion inhibition treatment layer 112 is formed on at least the sealant layer 111 side of the barrier layer 113. For example, with a lithium ion secondary battery, the corrosion inhibition treatment layer 112 should be formed on the sealant layer 111 side so as to prevent the corrosion of the barrier layer 113 on the surface thereof with hydrofluoric acid generated by reaction between an electrolyte and moisture.

It will be noted that the corrosion inhibition treatment layer 112 may be formed on the substrate layer 115 side of the barrier layer 113, if necessary. In this case, the corrosion inhibition treatment layer 112 functions not only for corrosion inhibition, but also as an anchor layer of the sealant layer 111 and a substrate adhesive layer 114.

For the formation of the corrosion inhibition treatment layer 112, there can be used, for example, a chromate treatment using a corrosion inhibition treatment agent which is made of a chromate salt, a phosphate salt or a fluoride and a variety of thermosetting resins, or a ceria sol treatment using a corrosion inhibition treatment agent made of cerium oxide, which is one of rare earth element oxides, a phosphate salt and a variety of thermosetting resin. The corrosion inhibition treatment layer 112 is not limited to the film formed by the above treatment but may be any type of film that satisfies a requirement for corrosion resistance of the barrier layer 113. For instance, a phosphate salt treatment or a boehmite treatment may be used. The corrosion inhibition treatment layer 112 is not limited to a single layer, but may be made of two or more layers arranged in such a way that a resin, serving as an overcoat agent, is coated onto a film having a corrosion inhibition function thereby imparting a corrosion resistance thereto.

The thickness of the corrosion inhibition treatment layer 112 is preferably 5 nm to 11 µm, more preferably 10 to 200 nm in view of the corrosion inhibition function and a function as an anchor.

<Barrier Layer 113>

The barrier layer 113 is formed between the substrate layer 115 (or the substrate adhesive layer 114 provided as required) and the sealant layer 111. The barrier layer 113 should have high water vapor barrier properties so as to prevent the filtration of moisture in the battery and stretchability.

Various types of metal foils such as aluminum, stainless steel, copper and the like can be used as the barrier layer 113, of which an aluminum foil is preferred from the standpoint of weight (specific gravity), water proofness and costs. Usable aluminum foils include known soft aluminum foils, of which an iron-containing aluminum is preferred in view of its pinhole resistance and spreadability during molding. The content of iron in the aluminum foil is preferably 0.1 to 9.0 mass %, more preferably 0.5 to 2.0 mass %. If the content of iron is not less than the lower limit, there is a tendency to improve the pinhole resistance and the stretchability, and if below the upper limit, there is a tendency to improve flexibility.

The thickness of the barrier layer 113 is preferably 10 to 100 µm, more preferably 15 to 80 µm, from the standpoint of barrier properties, a pinhole resistance and processability.

Although an untreated aluminum foil may be used for the barrier layer 113, a metal foil having been subjected, for example, to defatting treatment is preferably used. The defatting treatment can be broadly classified into a wet type and a dry type.

The wet type of defatting treatment includes, for example, those of acid defatting and alkali defatting. The acids used for the acid defatting include, for example, inorganic acids such as sulfuric acid, nitric acid, hydrochloric acid, hydrofluoric acid and the like. These acids may be used singly or in combination of two or more. In order to improve the etching effect of a metal foil, various metals salts serving as a supply source of iron (III) ions, cerium (III) ions may be formulated, if necessary. The alkalis used for the alkali defatting include, for example, a strong etching type of alkalis such as sodium hydroxide. Alternatively, those formulated with a weakly alkaline compound or a surfactant may also be used. The wet type of defatting treatment is carried out by an immersion method or a spraying method.

The dry type of defatting treatment is carried out in such a way that where the barrier layer is formed, for example, of an aluminum foil, the defatting treatment can be carried out by a method wherein the treating time is prolonged in the annealing step of aluminum. Aside from the defatting treatments, a flame treatment or a corona treatment may be mentioned. Moreover, such defatting treatment may be adopted that contaminant substances are oxidatively decomposed and removed by means of active oxygen generated by irradiation of UV light having a specific wavelength.

<Substrate Adhesive Layer 114>

The substrate adhesive layer 114 is formed between the substrate layer 115 and the barrier layer 113, if necessary. The substrate adhesive layer 114 has an adhesion force necessary for strongly bonding the substrate layer 115 and the barrier layer 113 together. For the formation of the substrate adhesive layer 114, there can be used a two-component curing adhesive comprising as a main agent a polyester polyol, a polyether polyol, an acrylic polyol or the like and as a curing agent an aromatic or aliphatic isocyanate. The substrate adhesive layer 114 may be further admixed with a thermoplastic elastomer, a tackifier, a filler, a pigment or a dye.

The thickness of the substrate adhesive layer 114 is preferably 0.5 to 10 µm, more preferably 1 to 5 µm, in view of adhesion strength, followability and processability.

<Substrate Layer 115>

The substrate layer 115 is formed on the barrier layer 113 in some cases through the substrate adhesive layer 114. The substrate layer 115 serves to impart a heat resistance in the sealing step in the course of the fabrication of a power storage device and also to suppress the generation of pinholes as would occur in the course of processing and distribution. Additionally, it also serves to prevent breakage of the barrier layer 113 during molding and ensures electric insulation by preventing the contact between the barrier layer 113 and other metal.

The substrate layer 115 may be formed by laminating, for example, a stretched film or the like on the barrier layer 113 through the substrate adhesive layer 114, or may be directly formed (as a cover layer) by applying a liquid resin on the barrier layer 113. The formation of the substrate layer 115 is not specifically limited to either one of them. With the former case, good deep draw moldability is ensured, and with the latter case, the total thickness of the packaging material 100 for power storage device can be made thin, which tends to enable the fabrication of a thinner battery.

The stretched film or the like includes, for example, stretched or unstretched films such as of polyester resins, polyamide resins or polyolefin resins. Of these, biaxially stretched polyamide or biaxially stretched polyester films are preferred from the standpoint of improving moldability, heat resistance, pierce resistance and electric insulation. These films may be used singly or in the form of a composite film obtained by bonding two or more films together.

The liquid resin (coating resin solution) includes a polyester resin, a polyurethane resin, a fluorine resin, a polyimide resin, a polyamide imide resin, a polyether imide resin, an epoxy resin, a melamine resin or the like. Of these, the polyester resin is preferred from the aspects of mechanical characteristics, chemical resistance, insulation and costs. As to a crosslinking method, no specific limitation is placed thereon, e.g. the crosslinking may be performed using a known curing agent such as an isocyanate, or may be performed by baking with a melamine or epoxy compound.

The substrate layer 115 may be dispersed therein or coated on the surface thereof with additives such as a flame retardant, a slipping agent, an anti-blocking agent, an anti-oxidant, a light stabilizer, a tackifier, an antistatic agent or the like. The slipping agent includes a fatty acid amide (e.g. oleic acid amide, erucic acid amide, stearic acid amide, behenic acid amide, ethylene bisoleic acid amide, ethylene biserucic acid amide or the like). The anti-blocking agents include those based on variety of fillers such as silica. The additives may be used singly or in combination of two or more.

The thickness of the substrate layer 115 is preferably 6 to 50 µm, more preferably 10 to 40 µm, in view of pierce resistance, electric insulation, moldability and the like.

The substrate layer 115 may be formed with irregularities on the surface thereof so as to improve a scratch resistance and slippage properties.

[Method of Producing a Packaging Material for Power Storage Device]

As to a method of producing a packaging material 100 for power storage device, an example of an embodiment is shown to illustrate the method. The following illustration shows an example and should not be construed as limiting the method of producing the packaging material 100 for power storage device thereto.

As a method of producing a packaging material 100 for power storage device, mention is made of a method including, for example, the following steps (I) to (III). It will be noted that the case that a substrate resin film is used as a substrate layer 115 is described below.

Step I: Step of forming a corrosion inhibition treatment 112 on one surface (first surface) of a barrier layer 113.

Step II: Step of bonding a substrate layer 115 to a surface (second surface) opposite to the first surface of the barrier layer 113 through a substrate adhesive layer 114.

Step III: Step of forming a sealant layer 111, made of a sealant resin material, on the corrosion inhibition treatment layer 112 formed on the barrier layer 113.

(Step I)

A corrosion inhibition treatment agent is applied onto the first surface of the barrier layer 113 and dried to form the corrosion inhibition treatment layer 112. At this time, another corrosion inhibition treatment layer 112 may be likewise formed on the second surface of the barrier layer 113 as required. It will be noted that the corrosion inhibition treatment agent includes, for example, a corrosion inhibition treatment agent for such ceria sol treatment as mentioned before, or a corrosion inhibition treatment agent for chromate treatment. The manner of coating the corrosion inhibition treatment agent is not specifically limited, for which various methods including gravure coating, reverse coating, roll coating, bar coating or the like may be adopted.

(Step II)

A substrate resin film forming the substrate layer 115 is bonded to the second surface of the barrier layer 113 through the substrate adhesive layer 114 according to a dry lamination method to form the substrate layer 115. After the lamination, aging treatment is performed, for example, at 60° C. for 7 days to obtain a laminate having the corrosion inhibition treatment layer 112, the barrier layer 113, the substrate adhesive layer 114 and the substrate layer 115.

(Step III)

A resin material for sealant layer is coated onto the corrosion inhibition treatment layer 112 of the laminate wherein the substrate layer 115, the substrate adhesive layer 114, the barrier layer 113 and the corrosion inhibition treatment layer 112 are stacked in this order, followed by drying to form the sealant layer 111 on the first surface of the barrier layer 113. The manner of coating is not specifically limited, and a variety of methods such as gravure coating, reverse coating, roll coating, bar coating and the like can be adopted.

The steps (I) to (III) illustrated above are performed to obtain the packaging material 100 for power storage device. It will be noted that the order of the steps of the method of producing the packaging material 100 for power storage device are not limited to the method wherein the (I) to (III) are successively carried out. For example, where the corrosion inhibition treatment layer 112 is not formed on the second surface of the barrier layer 113, the step (I) may be carried out after the step (II) has been performed.

[Method for Fabricating a Power Storage Device]

The method of fabricating a power storage device 200 is described below. The method of fabrication of the power storage device 200 is one including, for example, the following steps (I) to (III).

Step (I): Step of forming a molded section, in which a battery element is set, at the half region of the packaging material 100 for power storage device.

Step (II): Step of setting a battery element in the molded section of the packaging material 100 for power storage device, folding back the other half region of the packaging material 100 for power storage device so that the sealant layer 111 becomes an inner surface, keeping the inner surfaces in touch with each other at three sides, and subjecting only one side, at which a tab made of a lead and a tab sealant is slipped, to pressure heat sealing.

Step III: Step of subjecting only one side of the other two sides to pressure heat sealing, injecting an electrolytic solution from the remaining one side and subjecting this side to pressure heat sealing in vacuum state.

The steps (I) to (III) described above is carried out to obtain a power storage device 200. In this regard, however, the method of fabricating the power storage device 200 is not limited to such a method as described above.

Figure 4:
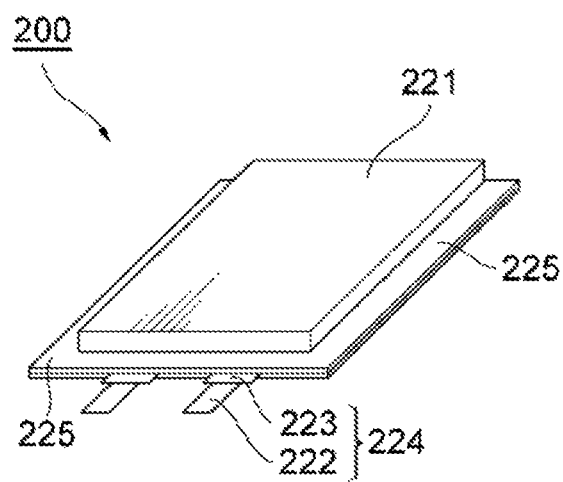
FIG. 4 is a perspective view showing a power storage device obtained by use of a packaging material for power storage device according to an embodiment of the invention.

The power storage device 200 of the present embodiment obtained in this way has such a structure that as shown in FIG. 4, the power storage device element is accommodated in a packaging material 221 for power storage device, and tabs 224 each made of a lead 222 and a tab sealant 223, which are connected to a positive electrode and a negative electrode of the power storage device element, respectively, are sandwiched with the pressure heat-sealed portions 225.

The first and second embodiments of the present invention have been described in detail with reference to the accompanying drawings. Specific configurations should not be construed as limited to these embodiments and embrace alterations in design without departing from the scope of the present invention.

EXAMPLES (First Invention)

The first invention is more particularly described based on Examples, which should not be construed as limiting the first invention thereto.

[Materials Used]

The materials used in Examples and Comparative Examples are shown below.

<Substrate Layer (15 μm in Thickness)>

A nylon film (Ny) (manufactured by Toyobo Co., Ltd.) was used.

<First Adhesive Layer (4 μm in Thickness)>

A polyurethane adhesive (manufactured by Toyo Ink Co., Ltd.) was used in which a tolylene diisocyanate adduct curing agent was formulated in a polyester polyol-based main agent.

<Corrosion Inhibition Treatment Layer>

"Sodium polyphosphate-stabilized cerium oxide sol" was used, in which a solid concentration was adjusted to 10 mass % using distilled water as a solvent. It will be noted that the sodium polyphosphate-stabilized cerium oxide sol was obtained by formulating 10 parts by mass of a Na salt of phosphoric acid per 100 parts by mass of cerium oxide.

<Metal Foil Layer (35 μm in Thickness)>

An annealed, defatted soft aluminum foil (8079 material, manufactured by Toyo Aluminum K.K.) was used.

<Second Adhesive Layer (4 μm in Thickness)

The adhesive used was obtained by formulating 10 parts by mass (solid content ratio) of a polyisocyanate compound having an isocyanurate structure in 100 parts by mass of a maleic anhydride-modified polyolefin resin dissolved in toluene.

<Sealant Layer (Thickness was Indicated in Table>

SPP: maleic anhydride-modified polypropylene (Admer, manufactured by Mitsui Chemicals, Inc.)

PP: Polypropylene (Prime Polypro, manufactured by Prime Polypro Co., Ltd.)

<Inorganic Filler>

Aluminum oxide: manufactured by Denka Co., Ltd. (spherical)

Silicon nitride: NTK Ceratech Co., Ltd. (amorphous)

Boron nitride: manufactured by 3M Japan Limited (plate-like)

Silicon oxide: manufactured by Denka Co., Ltd. (spherical)

Titanium oxide: manufactured by Fuji Titanium Industry Co., Ltd. (spherical)

*Surface treatment of inorganic fillers: Silane coupling agent (manufactured by Dow Corning Toray Co., Ltd.)

[Example 1] (Sealant Layer: Thermal Lamination)

A sodium polyphosphate-stabilized cerium oxide sol was coated onto one surface of a metal foil layer by microgravure coating in a dry coating amount of 70 mg/m², followed by baking treatment at 200° C. in a drying unit. In this way, a first corrosion inhibition treatment layer was formed on the metal foil layer.

Next, a sodium polyphosphate-stabilized cerium oxide sol was coated on the other surface of the metal foil layer by microgravure coating in a dry coating amount of 70 mg/m², followed by baking treatment in a drying unit at 200° C. Thus, a second corrosion inhibition treatment layer was formed on the metal foil layer.

Next, the first corrosion inhibition treatment layer side of the metal foil layer, on which the first and second corrosion inhibition treatment layers had been formed, was bonded to a substrate layer by use of a polyurethane adhesive (first adhesive layer) according to a dry lamination process. This was set in an unwinding unit of an extrusion lamination machine, followed by co-extrusion on the second corrosion inhibition treatment layer under processing conditions of 290° C. and 100 m/minute to stack a sealant layer (35 μm in thickness) of configuration-1. It will be noted that as to the sealant layer, a desired layer was preliminarily prepared by use of a biaxial extruder and was used for extrusion lamination after through the steps of water quenching and pelletization. It will also be noted that the configurations of the sealant layer were just as shown in Tables 1 and 2.

The laminate obtained in this way was subjected to thermal treatment by thermal lamination so that the maximum arrival temperature of the laminate was at 190° C. to prepare a packaging material (a laminate of substrate layer/first adhesive layer/first corrosion inhibition treatment layer/metal foil layer/second corrosion inhibition treatment layer/sealant layer).

[Examples 2 to 31, Comparative Examples 1 to 3](Sealant Layer: Thermal Laminate)

Packaging materials were prepared in the same manner as in Example 1 except that sealant layers having such configurations as indicated in Tables 1 and 2 were used in place of the sealant layer of configuration-1.

[Examples 32 to 40] (Sealant Layer: Dry Laminate)

In the same manner as in Example 1, the laminate of substrate layer/first corrosion inhibition treatment layer/metal foil layer/second corrosion inhibition treatment layer was prepared. Next, an adhesive layer (second adhesive layer) was coated onto the second corrosion inhibition treatment layer according to a dry lamination process in a dry coating amount of 4 to 5 g/m², followed by bonding of a sealant layer after drying and film formation. It will be noted that the surface of the sealant layer to be bonded with the adhesive was subjected to corona treatment. Thereafter, aging at 40° C. for 5 days was carried out to prepare a packaging material (a laminate of substrate layer/first adhesive layer/first corrosion inhibition treatment layer/metal foil layer/second corrosion inhibition treatment layer/second adhesive layer/sealant layer).

TABLE 1

| | Total thickness (μm) | Metal layer side ① | Intermediate layer ② | Innermost layer side ③ | Ratio of the respective layer thickness to total thickness | | |
| --- | --- | --- | --- | --- | --- | --- | --- |
| | | | | | ① | ② | ③ |
| Configuration-1 | 35 | SPP | — | — | 100% | — | — |
| Configuration-2 | 35 | SPP | — | SPP | 70% | — | 30% |
| Configuration-3 | 35 | SPP | — | SPP | 30% | — | 70% |
| Configuration-4 | 35 | SPP | — | PP | 70% | — | 30% |
| Configuration-5 | 35 | SPP | — | PP | 70% | — | 30% |
| Configuration-6 | 35 | SPP | SPP | SPP | 15% | 70% | 15% |
| Configuration-7 | 35 | SPP | PP | PP | 15% | 70% | 15% |

TABLE 1-continued

|  | Total thickness (μm) | Metal layer side ① | Intermediate layer ② | Innermost layer side ③ | Ratio of the respective layer thickness to total thickness ① | ② | ③ |
|---|---|---|---|---|---|---|---|
| Configuration-8 | 35 | SPP | PP | SPP | 15% | 70% | 15% |
| Configuration-9 | 35 | SPP | SPP | PP | 15% | 70% | 15% |
| Configuration-10 | 35 | SPP | SPP | PP | 15% | 70% | 15% |
| Configuration-11 | 35 | SPP | SPP | PP | 15% | 70% | 15% |
| Configuration-12 | 35 | SPP | SPP | PP | 15% | 70% | 15% |
| Configuration-13 | 35 | SPP | SPP | PP | 15% | 70% | 15% |
| Configuration-14 | 35 | SPP | SPP | PP | 15% | 70% | 15% |
| Configuration-15 | 35 | SPP | SPP | PP | 15% | 70% | 15% |
| Configuration-16 | 35 | SPP | SPP | PP | 15% | 70% | 15% |
| Configuration-17 | 35 | SPP | SPP | PP | 15% | 70% | 15% |
| Configuration-18 | 35 | SPP | SPP | PP | 15% | 70% | 15% |
| Configuration-19 | 35 | SPP | SPP | PP | 15% | 70% | 15% |
| Configuration-20 | 35 | SPP | SPP | PP | 5% | 90% | 5% |
| Configuration-21 | 35 | SPP | SPP | PP | 25% | 50% | 25% |
| Configuration-22 | 35 | SPP | SPP | PP | 35% | 30% | 35% |
| Configuration-23 | 80 | SPP | SPP | PP | 15% | 70% | 15% |
| Configuration-24 | 45 | SPP | SPP | PP | 15% | 70% | 15% |
| Configuration-25 | 20 | SPP | SPP | PP | 15% | 70% | 15% |
| Configuration-26 | 35 | SPP | SPP | PP | 15% | 70% | 15% |
| Configuration-27 | 35 | SPP | SPP | PP | 70% | 15% | 15% |
| Configuration-28 | 35 | SPP | SPP | PP | 15% | 15% | 70% |
| Configuration-29 | 35 | SPP | SPP | PP | 15% | 70% | 15% |
| Configuration-30 | 35 | SPP | SPP | PP | 15% | 70% | 15% |
| Configuration-31 | 35 | SPP | SPP | PP | 15% | 70% | 15% |
| Configuration-32 | 35 | SPP | SPP | PP | 15% | 70% | 15% |
| Configuration-33 | 35 | SPP | SPP | PP | 15% | 70% | 15% |
| Configuration-34 | 35 | SPP | SPP | PP | 15% | 70% | 15% |
| Configuration-35 | 35 | PP | — | — | 100% | — | — |
| Configuration-36 | 35 | PP | — | SPP | 70% | — | 30% |
| Configuration-37 | 35 | PP | — | SPP | 30% | — | 70% |
| Configuration-38 | 35 | PP | — | PP | 70% | — | 30% |
| Configuration-39 | 35 | PP | — | PP | 30% | — | 70% |
| Configuration-40 | 35 | PP | SPP | SPP | 15% | 70% | 15% |
| Configuration-41 | 35 | PP | PP | PP | 15% | 70% | 15% |
| Configuration-42 | 35 | PP | PP | SPP | 15% | 70% | 15% |
| Configuration-43 | 35 | PP | SPP | PP | 15% | 70% | 15% |

TABLE 2

|  | Inorganic filler | | | | |
|---|---|---|---|---|---|
|  | Constituent material | Surface treatment | Containing layer | Ratio of sealant layer thickness to total thickness | Content in sealant layer (mass %) |
| Configuration-1 | Aluminum oxide | yes | ① | 25% | 15% |
| Configuration-2 | Aluminum oxide | yes | ① | 25% | 15% |
| Configuration-3 | Aluminum oxide | yes | ③ | 25% | 15% |
| Configuration-4 | Aluminum oxide | yes | ① | 25% | 15% |
| Configuration-5 | Aluminum oxide | yes | ①, ③ | 25% | 15% |
| Configuration-6 | Aluminum oxide | yes | ② | 25% | 15% |
| Configuration-7 | Aluminum oxide | yes | ② | 25% | 15% |
| Configuration-8 | Aluminum oxide | yes | ② | 25% | 15% |
| Configuration-9 | Aluminum oxide | yes | ② | 50% | 15% |
| Configuration-10 | Aluminum oxide | yes | ② | 25% | 15% |
| Configuration-11 | Aluminum oxide | yes | ② | 10% | 15% |
| Configuration-12 | Aluminum oxide | yes | ② | 5% | 5% |
| Configuration-13 | Aluminum oxide | yes | ② | 60% | 35% |
| Configuration-14 | Aluminum oxide | yes | ② | 2% | 15% |
| Configuration-15 | Aluminum oxide | yes | ② | 25% | 35% |
| Configuration-16 | Aluminum oxide | yes | ② | 25% | 25% |
| Configuration-17 | Aluminum oxide | yes | ② | 25% | 5% |
| Configuration-18 | Aluminum oxide | yes | ② | 45% | 50% |
| Configuration-19 | Aluminum oxide | yes | ② | 5% | 2% |
| Configuration-20 | Aluminum oxide | yes | ② | 25% | 15% |
| Configuration-21 | Aluminum oxide | yes | ② | 25% | 15% |
| Configuration-22 | Aluminum oxide | yes | ② | 25% | 15% |
| Configuration-23 | Aluminum oxide | yes | ② | 25% | 15% |
| Configuration-24 | Aluminum oxide | yes | ② | 25% | 15% |
| Configuration-25 | Aluminum oxide | yes | ② | 25% | 15% |
| Configuration-26 | Aluminum oxide | no | ② | 25% | 15% |
| Configuration-27 | Aluminum oxide | yes | ① | 25% | 15% |

TABLE 2-continued

|  | Inorganic filler | | | | |
| --- | --- | --- | --- | --- | --- |
|  | Constituent material | Surface treatment | Containing layer | Ratio of sealant layer thickness to total thickness | Content in sealant layer (mass %) |
| Configuration-28 | Aluminum oxide | yes | ③ | 25% | 15% |
| Configuration-29 | Aluminum oxide | yes | ①, ② | 25% | 15% |
| Configuration-30 | Silicon nitride | yes | ② | 25% | 15% |
| Configuration-31 | Boron nitride | yes | ② | 25% | 15% |
| Configuration-32 | Silicon oxide | yes | ② | 25% | 15% |
| Configuration-33 | Titanium oxide | yes | ② | 25% | 15% |
| Configuration-34 | — | — | — | — | — |
| Configuration-35 | Aluminum oxide | yes | ① | 25% | 15% |
| Configuration-36 | Aluminum oxide | yes | ① | 25% | 15% |
| Configuration-37 | Aluminum oxide | yes | ② | 25% | 15% |
| Configuration-38 | Aluminum oxide | yes | ① | 25% | 15% |
| Configuration-39 | Aluminum oxide | yes | ② | 25% | 15% |
| Configuration-40 | Aluminum oxide | yes | ② | 25% | 15% |
| Configuration-41 | Aluminum oxide | yes | ② | 25% | 15% |
| Configuration-42 | Aluminum oxide | yes | ② | 25% | 15% |
| Configuration-43 | Aluminum oxide | yes | ② | 25% | 15% |

Figure 5:
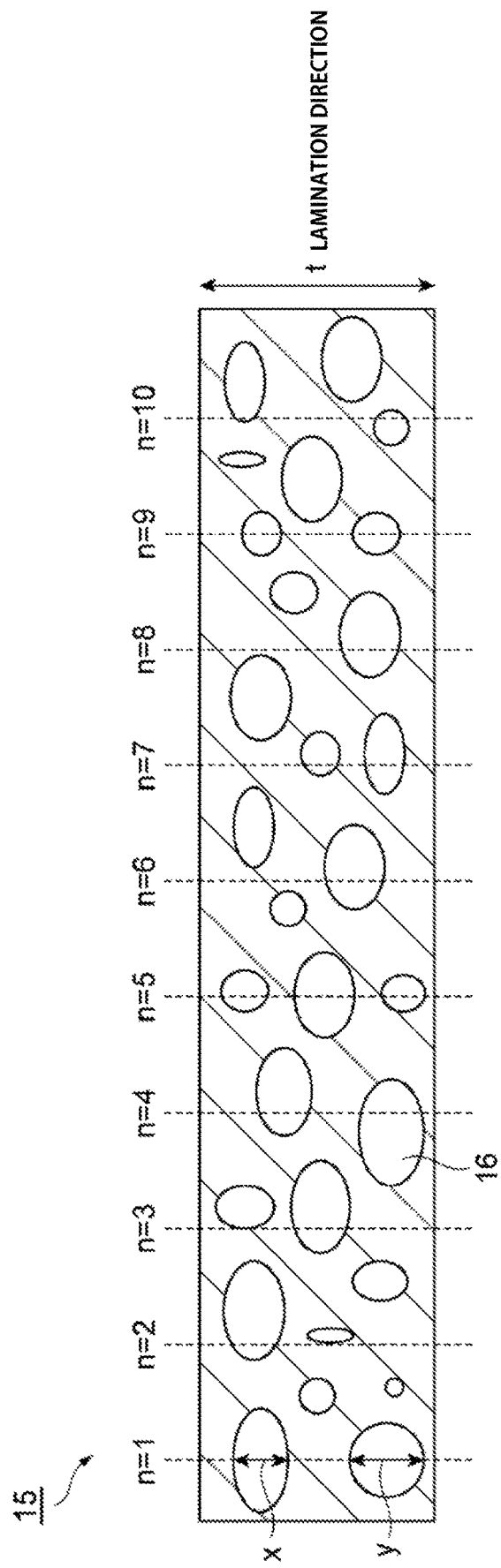
FIG. 5 is a schematic view illustrating a method of calculating an occupying ratio of an inorganic filler to a total thickness of a sealant layer.

It will be noted that in the table, the occupying ratio of an inorganic filler to the total thickness of the sealant layer was calculated as shown in FIG. 5.

Initially, the section of the sealant layer cut along the lamination direction of a packaging material is shot with a microscope and subjected to image processing. On this occasion, a measuring point of n=1 as an arbitrary starting point is determined. Nine measuring points are provided at intervals of every 0.1 mm from the starting point along the surface direction, and ten measuring points including the starting point are determined. Next, as shown in FIG. 5, at the measuring point of n=1, the total thickness t of the sealant layer and a cumulative length of x+y along the vertical direction of the inorganic filler (two particles at the measuring point of n=1) are determined. (x+y)/t×100(%) is calculated to determine an occupying ratio of the inorganic filler (i.e. a length along the vertical direction) to the total thickness of the sealant layer at the arbitrary measuring point of n=1. This is repeated for the measuring points of n=2 to n=10 and an average value thereof is calculated, thus enabling the determination of the occupying ratio of the inorganic filler to the total thickness of the sealant layer.

<Evaluation>

The packaging materials obtained in the Examples and the Comparative Examples were subjected to the following evaluation tests.

(Lamination Strength in Electrolytic Solution)

An electrolytic solution obtained by adding 1M of LiPF$_6$ in a mixed solution of ethylene carbonate/diethyl carbonate/dimethyl carbonate=1/1/1 (ratio by mass) was injected into a teflon (registered trade name) container, in which a 15 mm×100 mm sample cut from a packaging material was placed and kept at 85° C. for 24 hours after having been sealed with an airtight stopper. Thereafter, the sample was pre-washed, and the lamination strength (T-type peeling strength) between the metal foil layer and the sealant layer or between the metal foil layer and the second adhesive layer was measured by using a testing machine (manufactured by Instron Co., Ltd.). The test was conducted according to JIS K6854 in an atmosphere of 23° C. and 50% R.H., at a peeling speed of 50 mm/minute. The results were evaluated according to the following standards.

A: Lamination strength exceeds 9N/15 mm.

B: Lamination strength is not less than 7N/15 mm to not larger than 9N/15 mm.

C: Lamination strength is not less than 5N/15 mm to less than 7N/15 mm.

D: Lamination strength is less than 5N/15 mm.

(Heat Sealing Strength Against Electrolytic Solution)

Figure 6:
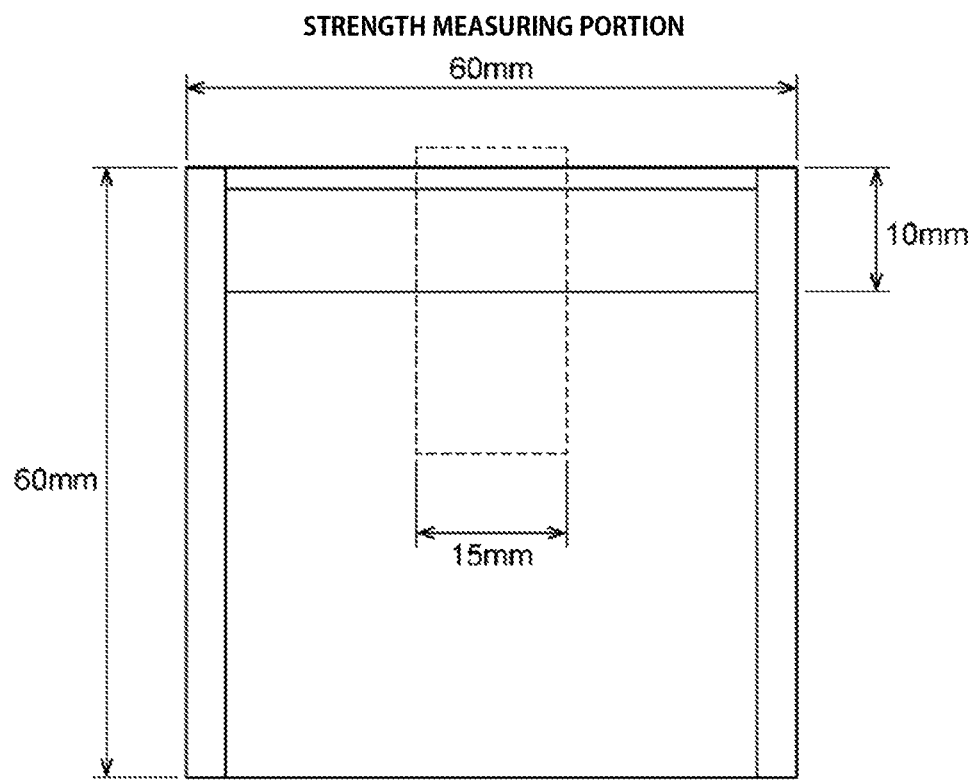
FIG. 6 is a schematic view illustrating a method of making an evaluation sample in the Examples.

A 60 mm×120 mm sample cut from a packaging material was folded into halves, and was heat sealed at one side thereof by means of a 10 mm wide sealing bar at 190° C. and 0.5 MPa for 3 seconds. Thereafter, further heat sealing at the other two sides was performed to provide the sample in the form of a pouch. 1 ml of an electrolytic solution obtained by adding 1M of LiPF$_6$ in a mixed solution of ethylene carbonate/diethyl carbonate/dimethyl carbonate=1/1/1 (ratio by mass) was injected into the pouch, which was kept at 60° C. for 24 hours. Subsequently, the heat-sealed one side was cut into a 15 mm wide piece (see FIG. 6) and subjected to measurement of seal strength (T-type peeling strength) by use of a testing machine (manufactured by Instron Co., Ltd.). The test was conducted according to JIS K6854 in an atmosphere of 23° C. and 50% R.H., at a peeling speed of 50 mm/minute. The results were evaluated according to the following standards.

A: Seal strength is not less than 80 N/15 mm and a burst width exceeds 5 mm.

B: Seal strength is not less than 80 N/15 mm and a burst width is 3 to 5 mm.

C: Seal strength is not less than 60 N/15 mm and less than 80 N/15 mm.

D: Seal strength is less than 60 N/15 mm.

(Degassing Heat Seal Strength)

Figure 7:
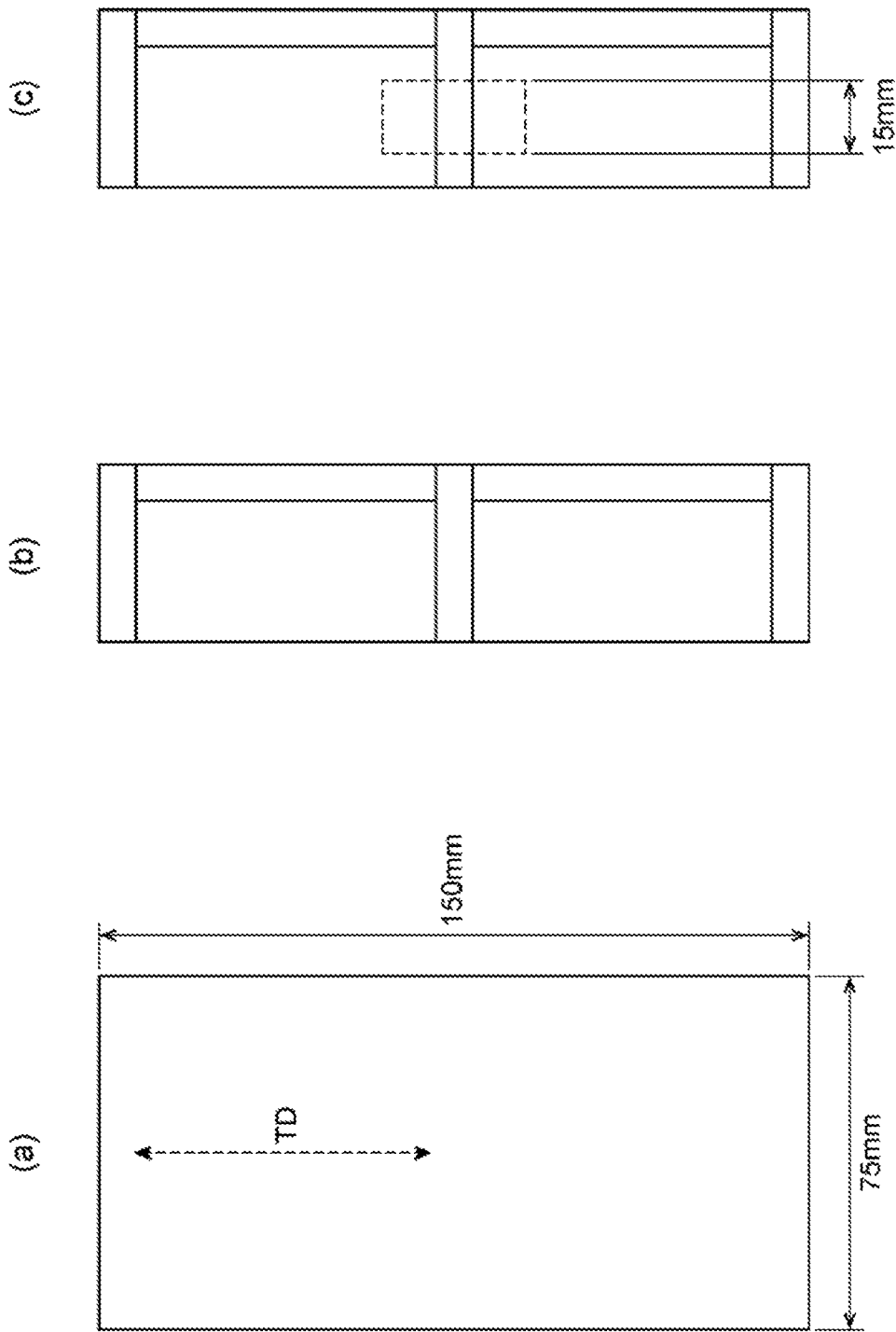
FIG. 7 is a schematic view illustrating a method of making an evaluation sample in the Examples.

A packaging material was cut into a 75 mm×150 mm sample and doubled up to provide a 37.5 mm×150 mm piece (see FIG. 7(a)), followed by heat sealing at the 150 mm side and the 37.5 mm side to provide a pouch. Thereafter, 5 ml of an electrolytic solution wherein LiPF$_6$ was added to a mixed solution of ethylene carbonate/diethyl carbonate/dimethyl carbonate=1/1/1 (ratio by mass) so as to make 1 M thereof was charged into the pouch, followed by heat sealing and keeping at 60° C. for 24 hours. Thereafter, the pouch was subjected to degassing heat sealing at the central portion thereof at 190° C. and 0.3 MPa for 2 seconds (see FIG. 7(b)). In order to stabilize the sealed portion, the pouch was kept at a normal temperature for 24 hours, after which the degassing heat sealed portion was cut into a strip of 15 mm in width (see FIG. 7(c)), followed by measurement of heat seal strength (T-type peeling strength) by use of a testing machine (manufacture by Instron Co., Ltd.). The rest was conducted according to JIS K6854 in an atmosphere of 23° C. and 50% R.H., at a peeling speed of 50 mm/minute. The results were evaluated based on the following standards.

A: Seal strength is not less than 60 N/15 mm.

B: Seal strength is not less than 40 N/15 mm and less than 60 N/15 mm.

C: Seal strength is not less than 30 N/15 mm and less than 40 N/15 mm.

D: Seal strength is less than 30 N/15 mm.

(Insulation Performance)

A packaging material was cut into a 75 mm×150 mm sample and doubled up to provide a 37.5 mm×150 mm piece. Thereafter, a tab sealant and a tab were sandwiched, followed by top sealing (a seal pressure controlled by use of the gap) and subsequent side sealing. Thereafter, part of the outer layer was cut off to expose the metal layer for contact with an electrode. The tab (point A of FIG. 8(a)) and the exposed metal layer (point B of FIG. 8(a)) were connected to electrodes and applied with 25 V so as to measure a resistance value (insulation test 1).

Subsequently, 5 ml of an electrolytic solution was injected from the remaining side and sealed by heat sealing. After being kept at 60° C. for 24 hours, the pouch was subjected to degassing heat sealing at the central portion thereof at 190° C. and 0.3 MPa for 2 seconds. After being kept at a normal temperature for 24 hours, the tab (point A of FIG. 8(b)) and the exposed metal layer (point B of FIG. 8(b)) were connected to electrodes and applied with 25 V to measure a resistance value (insulation test 2).

The results of the insulation tests 1 and 2 were evaluated based on the following standards.

A: Not less than 200 MΩ

B: Not less than 100 MΩ and not larger than 200 MΩ

C: Not less than 30 MΩ and less than 100 MΩ

D: Less than 30 MΩ

(Total Quality)

The results of the respective evaluations are shown in Table 3. In Table 3, those having no D-rank evaluation are improved or even excellent in comprehensive quality.

TABLE 3

| | | Results of evaluation | | | | |
|---|---|---|---|---|---|---|
| | Configuration of sealant layer | Laminate strength in electrolytic solution | Heat seal strength against electrolytic solution | Degassing heat seal strength | Insulation performance 1 (insulation test) | Insulation performance 2 (insulation test) |
| Example 1-1 | Configuration-1 | B | B | B | A | A |
| Example 1-2 | Configuration-2 | B | A | A | A | A |
| Example 1-3 | Configuration-3 | A | B | B | A | A |
| Example 1-4 | Configuration-4 | B | A | A | A | A |
| Example 1-5 | Configuration-5 | B | B | B | A | A |
| Example 1-6 | Configuration-6 | A | A | A | A | A |
| Example 1-7 | Configuration-7 | A | B | B | A | B |
| Example 1-8 | Configuration-8 | A | B | B | A | B |
| Example 1-9 | Configuration-9 | A | B | B | A | A |
| Example 1-10 | Configuration-10 | A | A | A | A | A |
| Example 1-11 | Configuration-11 | A | A | A | B | B |
| Example 1-12 | Configuration-12 | A | A | A | B | C |
| Example 1-13 | Configuration-15 | A | B | B | A | A |
| Example 1-14 | Configuration-16 | A | A | A | A | A |
| Example 1-15 | Configuration-17 | A | A | A | B | C |
| Example 1-16 | Configuration-18 | A | C | C | A | A |
| Example 1-17 | Configuration-19 | A | A | A | B | C |
| Example 1-18 | Configuration-20 | A | A | A | A | A |
| Example 1-19 | Configuration-21 | A | A | A | B | B |
| Example 1-20 | Configuration-22 | A | A | A | B | C |
| Example 1-21 | Configuration-23 | A | A | A | A | A |
| Example 1-22 | Configuration-24 | A | A | A | A | A |
| Example 1-23 | Configuration-25 | A | B | B | B | B |
| Example 1-24 | Configuration-26 | A | A | A | B | B |
| Example 1-25 | Configuration-27 | B | A | A | A | A |
| Example 1-26 | Configuration-28 | A | B | B | A | A |
| Example 1-27 | Configuration-29 | B | A | A | A | A |
| Example 1-28 | Configuration-30 | A | A | A | A | A |
| Example 1-29 | Configuration-31 | A | A | A | A | A |
| Example 1-30 | Configuration-32 | A | A | A | A | A |
| Example 1-31 | Configuration-33 | A | A | A | A | A |
| Example 1-32 | Configuration-35 | B | B | B | A | B |
| Example 1-33 | Configuration-36 | B | A | A | A | B |
| Example 1-34 | Configuration-37 | A | B | B | A | A |
| Example 1-35 | Configuration-38 | B | A | A | A | B |
| Example 1-36 | Configuration-39 | A | B | B | A | B |
| Example 1-37 | Configuration-40 | A | A | A | A | A |
| Example 1-38 | Configuration-41 | A | A | A | A | B |
| Example 1-39 | Configuration-42 | A | A | A | A | B |
| Example 1-40 | Configuration-43 | A | A | A | A | A |
| Comparative Example 1 | Configuration-13 | B | D | D | A | A |
| Comparative Example 2 | Configuration-14 | A | A | A | B | D |
| Comparative Example 3 | Configuration-34 | A | A | A | C | D |

As will be apparent from the results of Tables 1 to 3, it will be seen that with the packaging materials for power storage device of the Examples, even where the sealant layer is made thin, good insulation can be held while achieving satisfactory heat seal strength. It will also be appreciated that when the inorganic filler-containing layers are made of SPP and are provided as an intermediate layer, good insulation can be held, particularly while keeping improved or even excellent laminate strength.

(Second Invention)

Next, the second invention is described in detail by way of example, which should not be construed as limited to the following description.

[Materials Used]

The materials used for making packaging materials for power storage device of Examples and Comparative Examples are shown below.

(Sealant Layer)

TABLE 4

| | Sealant layer | | | | High melting point material | | |
|---|---|---|---|---|---|---|---|
| | Type | Film thickness (μm) | Melting point (° C.) | Filler inclusion: yes or no | Melting point (° C.) | Average particle size (μm) | Ratio to thickness of sealant layer (%) | Number of particles per unit volume of sealant layer (particles/cm³) |
| Example 2-1 | Acid modified polypropylene | 10 | 150 | yes | 250 | 6 | 60 | 100,000 |
| Example 2-2 | Acid modified polypropylene | 10 | 150 | yes | 250 | 6 | 60 | 10,000 |
| Example 2-3 | Acid modified polypropylene | 10 | 150 | yes | 250 | 6 | 60 | 1,000,000 |
| Example 2-4 | Acid modified polypropylene | 10 | 150 | yes | 250 | 6 | 60 | 100 |
| Example 2-5 | Acid modified polypropylene | 10 | 150 | yes | 250 | 6 | 60 | 15,000,000 |
| Example 2-6 | Acid modified polypropylene | 5 | 150 | yes | 250 | 3 | 60 | 100,000 |
| Example 2-7 | Acid modified polypropylene | 7 | 150 | yes | 250 | 4 | 57 | 100,000 |
| Example 2-8 | Acid modified polypropylene | 10 | 100 | yes | 250 | 6 | 60 | 100,000 |
| Example 2-9 | Acid modified polypropylene | 10 | 120 | yes | 250 | 6 | 60 | 100,000 |
| Example 2-10 | Acid modified polypropylene | 10 | 160 | yes | 250 | 6 | 60 | 100,000 |
| Example 2-11 | Acid modified polypropylene | 10 | 165 | yes | 250 | 6 | 60 | 100,000 |
| Example 2-12 | Acid modified polypropylene | 10 | 165 | yes | 220 | 6 | 60 | 100,000 |
| Example 2-13 | Acid modified polypropylene | 10 | 150 | yes | 250 | 3 | 30 | 100,000 |
| Example 2-14 | Acid modified polypropylene | 10 | 150 | yes | 250 | 4 | 40 | 100,000 |
| Example 2-15 | Acid modified polypropylene | 10 | 150 | yes | 250 | 7 | 70 | 100,000 |
| Example 2-16 | Acid modified polypropylene | 10 | 150 | yes | 250 | 8 | 80 | 100,000 |
| Comparative Example 1 | Acid modified polypropylene | 4 | 150 | yes | 250 | 2 | 50 | 100,000 |
| Comparative Example 2 | Acid modified polypropylene | 10 | 150 | no | — | — | — | — |

(Corrosion Inhibition Treatment Layer)
Cerium oxide (100 nm in thickness)
(Barrier Layer)
Soft aluminum foil 8079 material (30 μm in thickness)
(Substrate Adhesive Layer)
Polyurethane adhesive (3 μm in thickness)
(Substrate Layer)
Nylon film (25 μm in thickness)
(High Melting Point Material)
Aluminum oxide filler

[Evaluation]

The packaging materials for power storage device of the Examples and the Comparative Examples were evaluated in the following way.

(Evaluation of Electric Insulation)

A packaging material 100 for power storage device of the respective Examples and Comparative Examples was cut to provide a 120 mm×60 mm piece and folded into halves so that the sealant layer became an inner side. Next, the folded portion was set as a bottom line and left and right both end portions were heat sealed under conditions of 190° C./0.5 MPa/3 seconds at a width of 5 mm to provide a pouch. A mixed solution of ethylene carbonate/diethyl carbonate/dimethyl carbonate (1/1/1 on weight basis) and an electrolyte made of $LiPF_6$ salt was injected from the remaining one side, followed by slipping a nickel tab lead having a size of 50 μm in thickness, 12 mm in width and 50 mm in length and heat sealing at a width of 10 mm under different two conditions of "190° C./0.5 MPa/3 seconds" and "200° C./0.5 MPa/3 seconds" to provide samples for evaluating electric insulation. The sample was used to evaluation electric insulation by use of an AC/DC withstand voltage insulation resistance tester (manufactured by Kikusui Electronics Corp.).

(Evaluation Standards of Electric Insulation)

Electrodes were set at the tab lead of a sample and the barrier layer of a packaging material, followed by evaluation of electric insulation based on the following standards. The results are shown in Table 5.

Standards: A voltage of 25 V was applied for 5 seconds, and a measurement of not less than 25Ω was judged as "OK" and a measurement of less than 25Ω was judged as "NG".
"A": 190° C.: OK, 200° C.: OK
"B": 190° C.: OK, 200° C.: NG
"C": 190° C.: NG, 200° C.: NG (Evaluation of Heat Seal Strength)

The packaging material 100 for power storage device obtained according to the above production method was cut to provide a sample having a size of 120 mm×60 mm and folded into halves so that the sealant layer became an inner side. The end portions at a side opposite to the folded portion were heat sealed at a width of 10 mm under conditions of 190° C./0.5 MPa/3 seconds. Thereafter, the heat sealed portion was cut into a size of 15 mm in width×300 mm in length at the central portion thereof along its length to provide a sample for measuring heat seal strength. This was used to evaluate heat seal strength with a tensile testing machine (manufactured by Shimadzu Corporation).

(Evaluation Standards of Heat Seal Strength)

A T-type peeling test was conducted using the heat sealed portion of the sample under conditions of a tensile speed of 50 mm/minute and evaluated based on the following standards. The results are shown in Table 5.

"A": Heat seal strength of not less than 120 N
"B": Heat seal strength of not less than 90 N to less than 120 N
"C": Heat seal strength of less than 90 N.

TABLE 5

|  | Electric insulation | Heat seal strength |
|---|---|---|
| Example 2-1 | A | A |
| Example 2-2 | A | A |
| Example 2-3 | A | A |
| Example 2-4 | B | A |
| Example 2-5 | A | B |
| Example 2-6 | B | A |
| Example 2-7 | A | A |
| Example 2-8 | B | A |
| Example 2-9 | A | A |
| Example 2-10 | A | A |
| Example 2-11 | A | B |
| Example 2-12 | B | A |
| Example 2-13 | B | A |
| Example 2-14 | A | A |
| Example 2-15 | A | A |
| Example 2-16 | A | B |
| Comparative Example 1 | C | A |
| Comparative Example 2 | C | A |

In the Examples, it has been confirmed that both adequate thinning and improved or even excellent electric insulation can be satisfied. Moreover, it has also been confirmed that in the Examples, even when the sealant layer is made thin, heat seal strength cannot be impaired.

REFERENCE SIGNS LIST

10, 20, 100, 221 . . . packaging material for power storage device (packaging material), 11, 115 . . . substrate layer, 12, 114 . . . first adhesive layer (substrate adhesive layer), 13, 113 . . . metal foil layer (barrier layer), 14, 112 . . . corrosion inhibition treatment layer, 15, 111 . . . sealant layer, 16, 116 . . . inorganic filler (high melting point material), 17 . . . second adhesive layer, 200 . . . power storage device, 222 . . . lead, 223 . . . tab sealant, 224 . . . tab, 225 . . . pressure heat sealing unit

What is claimed is:

1. A packaging material for power storage device, comprising:
    a substrate layer,
    an adhesive layer,
    a metal foil layer, and
    a sealant layer, and,
    wherein the sealant layer contains an inorganic filler and an occupying ratio of the inorganic filler to a total thickness of the sealant layer in a section along the direction of lamination is 20% to 30% wherein the sealant layer is a three-layer structure comprising a first filler-free layer, an inorganic filler-containing layer and a second filler-free layer, wherein the inorganic filler-containing layer is sandwiched between the first filler-free layer and the second filler-free layer, wherein the inorganic filler-containing layer comprises the inorganic filler, and wherein each of the first-filler free layer and the second-filler free layer is free of the inorganic filler, wherein the first filler-free layer faces the metal foil layer, the first filler-free layer consists of an acid-modified polyolefin resin, and wherein the inorganic filler containing layer has a thickness of not less than 50% of the total thickness of the sealant layer.

2. The packaging material for power storage device of claim 1, wherein the inorganic filler-containing layer is one made of an acid-modified polyolefin resin.

3. The packaging material for power storage device of claim 1, wherein the inorganic filler is a surface-treated.

4. The packaging material for power storage device of claim 1, wherein the inorganic filler is an amorphous inorganic filler.

5. The packaging material for power storage device of claim 1, wherein the inorganic filler comprises a primary filler and a secondary filler coagulated to the primary filler, wherein a shape of the primary filler is selected from a sphere, a plate, a needle, a fiber, or a column.

6. The packaging material for power storage device of claim 1, wherein the inorganic filler is a high melting point material filler and a number of the inorganic filler per unit volume of the sealant layer is 10,000 to 10,000,000 particles/$cm^3$, wherein the high melting point material has a melting point of not lower than 220° C.

* * * * *